US012739059B2

(12) United States Patent
Yu

(10) Patent No.: US 12,739,059 B2
(45) Date of Patent: Sep. 15, 2026

(54) SLOT CONSISTENCY VERIFICATION METHOD AND RELATED DEVICE

(71) Applicant: HUAWEI TECHNOLOGIES CO., LTD., Shenzhen (CN)

(72) Inventor: Weiwei Yu, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 266 days.

(21) Appl. No.: 18/598,892

(22) Filed: Mar. 7, 2024

(65) Prior Publication Data

US 2024/0214122 A1 Jun. 27, 2024

Related U.S. Application Data

(63) Continuation of application No. PCT/CN2022/125552, filed on Oct. 17, 2022.

(30) Foreign Application Priority Data

Oct. 20, 2021 (CN) ........................ 202111220729.6

(51) Int. Cl.
*H04L 1/1607* (2023.01)
*H04J 3/16* (2006.01)
*H04L 1/00* (2006.01)

(52) U.S. Cl.
CPC .......... *H04L 1/1607* (2013.01); *H04J 3/1605* (2013.01); *H04L 1/0061* (2013.01)

(58) Field of Classification Search
CPC ... H04L 1/1607; H04L 1/0061; H04L 5/0044; H04J 3/1605; H04J 2203/0085; H04J 3/16; H04W 28/12
See application file for complete search history.

(56) References Cited

U.S. PATENT DOCUMENTS

2020/0322241 A1* 10/2020 Zhang ................... H04L 69/323
2022/0417957 A1* 12/2022 Liu .................. H04W 72/1263

FOREIGN PATENT DOCUMENTS

CN 101489265 A 7/2009
CN 112994843 A 6/2021
WO WO-2018020041 A1 * 2/2018 ........... H04L 1/0006

OTHER PUBLICATIONS

"IEEE Standard for Ethernet," IEEE Computer Society, IEEE Std 802.3-2018, Total 5600 pages, Institute of Electrical and Electronics Engineers, New York, New York (Jun. 2018).

(Continued)

*Primary Examiner* — Austin J Moreau
(74) *Attorney, Agent, or Firm* — Leydig, Voit & Mayer, Ltd.

(57) ABSTRACT

A slot consistency verification method is provided. The method is applied to a fine granularity service scenario, and includes: a sending end receives first information from a receiving end, where the first information indicates that a receiving slot used by the receiving end to receive a fine granularity service is consistent with a sending slot used by the sending end to send the fine granularity service; and the sending end sends a data block to the receiving end, where the data block includes a first basic frame overhead and a basic frame payload, the basic frame payload is for bearing the fine granularity service, and the fine granularity service is borne in the sending slot. According to the application, it is ensured that the sending slot used is consistent with the receiving slot, thereby ensuring normal running of the fine granularity service.

20 Claims, 13 Drawing Sheets

(56) References Cited

OTHER PUBLICATIONS

"Fine granularity slicing technical specification for slicing packet networks (SPN)," YDT 4610-2023, Communication Industry Standards of the People's Republic of China, Total 80 pages (Dec. 2023). With an English Abstract.

* cited by examiner

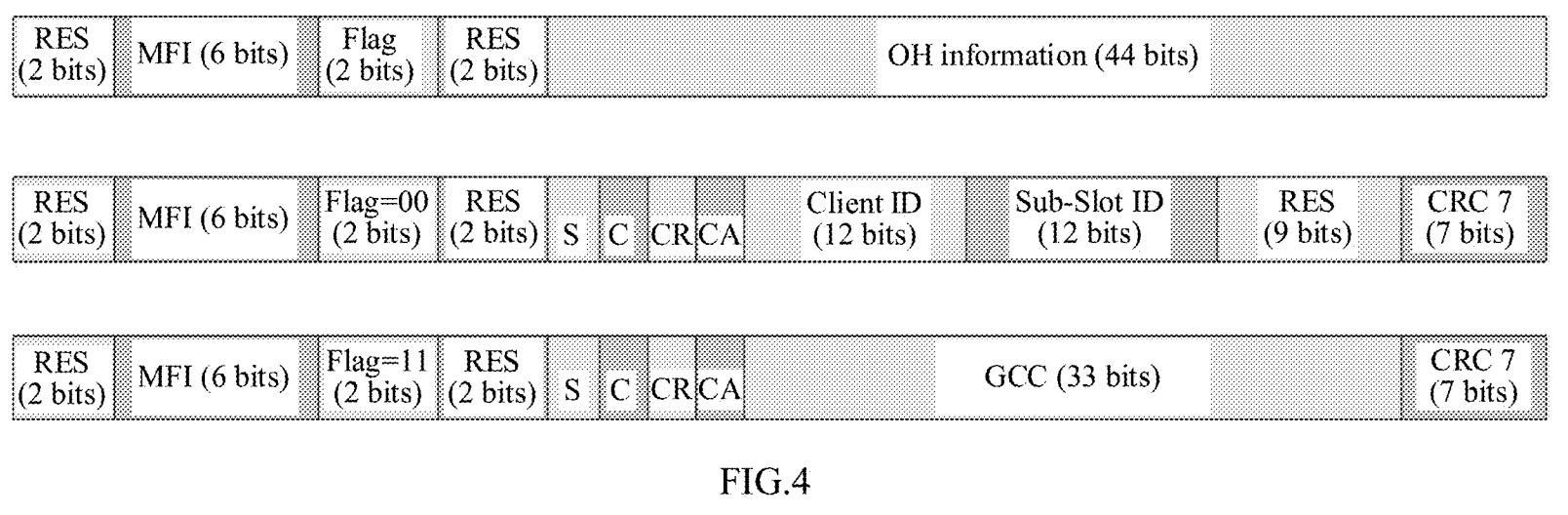

| RES (2 bits) | MFI (6 bits) | Flag (2 bits) | RES (2 bits) | OH information (44 bits) |
|---|---|---|---|---|

| RES (2 bits) | MFI (6 bits) | Flag=00 (2 bits) | RES (2 bits) | S | C | CR | CA | Client ID (12 bits) | Sub-Slot ID (12 bits) | RES (9 bits) | CRC 7 (7 bits) |
|---|---|---|---|---|---|---|---|---|---|---|---|

| RES (2 bits) | MFI (6 bits) | Flag=11 (2 bits) | RES (2 bits) | S | C | CR | CA | GCC (33 bits) | CRC 7 (7 bits) |
|---|---|---|---|---|---|---|---|---|---|

FIG.4

SLOT CONSISTENCY VERIFICATION METHOD AND RELATED DEVICE

CROSS-REFERENCE TO RELATED APPLICATIONS

This application is a continuation of International Application No. PCT/CN2022/125552, filed on Oct. 17, 2022, which claims priority to Chinese Patent Application No. 202111220729.6, filed on Oct. 20, 2021. The disclosures of the aforementioned applications are hereby incorporated by reference in their entireties.

TECHNICAL FIELD

Embodiments of this application relate to the field of communication technologies, and in particular, to a slot consistency verification method and a related device.

BACKGROUND

A fine granularity technology inherits a high-efficiency Ethernet kernel of a slicing packet network (SPN), and integrates a fine granularity slicing technology into an overall architecture of the SPN, so that a low-cost, refined, and hard-isolated fine granularity bearer pipe is provided. An FGU is also referred to as an X-Ethernet technology, and corresponds to an International Telecommunication Union-Telecommunication standardization sector (ITU-T) metro transport network (MTN) standard. The FGU fines a granularity of hard slicing from 5 gigabits per second (G-bits per second, Gbps) to 10 megabits per second (Mbps), to meet differentiated service bearer requirements, for example, a small bandwidth, high isolation, and high security, in scenarios such as a 5th generation mobile communication technology+(5G+) vertical industry application and a private line service.

In a fine granularity technology, a fine granularity service is borne by a fine granularity unit (FGU). In the fine granularity technology, a time-division multiplexing (TDM) mechanism is used, to cyclically send an FGU basic frame in a fixed periodicity, where a quantity and positions of slots in each frame are strictly fixed. Therefore, a sending periodicity of each slot is also deterministic. To support more slot channels with finer granularities and improve bandwidth utilization, an FGU solution uses a multiframe manner to perform slot division on 5 Gbps granularities at an SPN channel layer. One multiframe includes 20 FGU basic frames, each FGU basic frame supports 24 slots, and one 5 Gbps granularity at the SPN channel layer supports 480 slots. Each FGU basic frame includes an overhead (OH), a payload, and other structural components.

The fine granularity technology supports adjusting of a bandwidth of a specific fine granularity service, and specifically, adjusting the bandwidth of the fine granularity service by adjusting a slot used by the fine granularity service. Decrease adjustment of a bandwidth is used as an example: First, an upstream node sends an overhead (OH) to a downstream node to indicate the downstream node to adjust a slot used by a specific fine granularity service, where a CR field in the OH is 1. After receiving the OH whose CR field is 1, the downstream node determines, based on a slot indicated by a sub-slot identifier (sub-slot ID) field in the OH, a slot not used by the fine granularity service, and feeds back an OH to the upstream node, where a CA field in the fed-back OH is 1. After the upstream node determines, based on the OH that is from the downstream node and whose CA field is 1, that the downstream node has learned the slot not used by the fine granularity service, the upstream node sends an OH to the downstream node, where a C field in the OH is 1. The downstream node adjusts, based on the OH that is from the upstream node and whose C field is 1, the slot used by the fine granularity service to reduce a bandwidth of the fine granularity service.

Due to instability of a link, transmission of an OH exchanged between the upstream node and the downstream node may fail. As a result, the upstream node and the downstream node use inconsistent slots for a specific fine granularity service, and then the fine granularity service cannot be normally run.

SUMMARY

According to a first aspect, an embodiment of this application provides a slot consistency verification method, and including:

- a sending end receives first information from a receiving end, where the first information indicates that a receiving slot used by the receiving end to receive a fine granularity service is consistent with a sending slot used by the sending end to send the fine granularity service; and
- the sending end sends a data block to the receiving end, where the data block includes a first basic frame overhead and a basic frame payload, the basic frame payload is for bearing the fine granularity service, and the fine granularity service is borne in the sending slot.

Specifically, a fine granularity unit frame is also referred to as a fine granularity unit (FGU) frame or an FGU frame. In a fine granularity technology, a time-division multiplexing (TDM) mechanism is used, to cyclically send the fine granularity unit frame in a fixed periodicity, where a quantity and positions of slots in each frame are strictly fixed. Therefore, a sending periodicity of each slot is also deterministic.

The fine granularity unit frame includes an FGU basic unit frame (also referred to as an FGU basic frame, an FGU basic frame, a basic frame, or a unit frame). The FGU basic frame has a fixed length. Each FGU basic frame includes a basic frame overhead (OH) and a basic frame payload. In this embodiment of this application, the basic frame overhead is also referred to as an overhead or an OH. It should be noted that, the FGU basic frame may further include other content. This is not limited in this embodiment of this application.

In this embodiment of this application, after a receiving end performs verification on a slot resource of a fine granularity service, when the verification succeeds, a sending end receives first information from the receiving end, where the first information indicates that a receiving slot used by the receiving end to receive the fine granularity service is consistent with a sending slot used by the sending end to send the fine granularity service. After the sending end receives the first information, the sending end sends a data block to the receiving end, where the data block includes a first basic frame overhead and a basic frame payload, the basic frame payload is for bearing the fine granularity service, and the fine granularity service is borne in the sending slot. By using the foregoing method, it is ensured that the sending slot used by the sending end for the fine granularity service is consistent with the receiving slot used by the receiving end for the fine granularity service, thereby ensuring normal running of the fine granularity service.

In a possible implementation of the first aspect, before a sending end receives first information, the method further includes: The sending end sends a second basic frame overhead to the receiving end, where the second basic frame overhead carries first indication information, and the first indication information indicates that the sending slot has taken effect.

Optionally, a plurality of fields in the second basic frame overhead may be for bearing the first indication information. For example, a C field may be for bearing the first indication information, and the C field is also referred to as a slot effective indicator. When a value of the C field in the second basic frame overhead is 1, the C field is for bearing the first indication information, to be specific, the C field indicates that the sending slot (indicated by a slot identifier sub-slot ID field in the second basic frame overhead) for the fine granularity service (indicated by a client identifier client ID field in the second basic frame overhead) at the sending end has taken effect.

For another example, a RES field in the second basic frame overhead may be for bearing the first indication information. The RES field may be a RES field (2 bits) in the second basic frame overhead, or may be a RES field (9 bits) in the second basic frame overhead.

In a possible implementation, the sending end sends N second basic frame overheads, where the N second basic frame overheads are in a one-to-one correspondence with N pieces of indication information, and the N pieces of indication information are in a one-to-one correspondence with N slots. For example, if a sending slot for a fine granularity service A at the sending end occupies four slots, the sending end sends four second basic frame overheads to the receiving end, where the four second base station overheads are in a one-to-one correspondence with the four slots, and each second basic frame overhead indicates that one slot has taken effect as the sending slot.

In another possible implementation, the sending end sends one second basic frame overhead, where the one second basic frame overhead includes second information, and the second information is for identifying the sending slot. To be specific, the second basic frame overhead including the second information indicates that the sending slot occupying N slots has taken effect. The second information is a cyclic redundancy check (CRC) value generated by the sending end based on the sending slot.

By using the fine granularity service A as an example, the fine granularity service A occupies a slot 3, a slot 5, and a slot 7. The sending end generates a bit string with a length of 480 bits based on the slots occupied by the fine granularity service A. In the bit string of 480 bits, third, fifth, and seventh bits are set to 1, and other bits are set to 0. The sending end performs encoding processing on the bit string to generate a CRC value with a length of 12 bits, and the CRC value is used as the second information.

It may be understood that, that the length of the CRC value is 12 bits is merely an example description, and a length of the second information is not limited in this embodiment of this application. Further, the sending end may further encode the bit string in another encoding manner, to generate an encoding value with another length. This is not limited herein.

In a possible implementation of the first aspect, before a sending end receives first information, the method further includes: The sending end sends a third basic frame overhead to the receiving end, where the third basic frame overhead indicates the receiving end to check the sending slot, the third basic frame overhead includes second information, and the second information is for identifying the sending slot.

In a possible implementation, the sending end sends N third basic frame overheads, where the N third basic frame overheads are in a one-to-one correspondence with N pieces of indication information, and the N pieces of indication information are in a one-to-one correspondence with N slots. For example, if a sending slot for a fine granularity service A at the sending end occupies four slots, the sending end sends four third basic frame overheads to the receiving end, where the four second base station overheads are in a one-to-one correspondence with the four slots, and each third basic frame overhead indicates that one slot has taken effect as the sending slot.

In another possible implementation, the sending end sends one third basic frame overhead, where the one third basic frame overhead includes the second information. To be specific, the third basic frame overhead including the second information indicates that the sending slot occupying N slots has taken effect.

Optionally, the second information is a cyclic redundancy check CRC value generated by the sending end based on the sending slot. Specifically, the sending end first determines a first bit string based on the N slots, where N bits in the first bit string are in a one-to-one correspondence with the N slots. Then, the sending end encodes the first bit string by using a cyclic redundancy check (CRC) algorithm, to generate a CRC value.

In a possible implementation of the first aspect, the second information is a cyclic redundancy check CRC value generated by the sending end based on the sending slot.

In a possible implementation of the first aspect, the third basic frame overhead carries check indication information, and the check indication information indicates that the third basic frame overhead is for checking a slot resource of the fine granularity service.

Further, a plurality of fields in the third basic frame overhead may be for bearing the check indication information. For example, a flag field may be for bearing the check indication information. When a value of the flag field in the third basic frame overhead is 01 or 10, the flag field is for bearing the check indication information, to be specific, the flag field indicates the receiving end to check whether the sending slot (indicated by a client ID field in the third basic frame overhead) for the fine granularity service (indicated by a sub-slot ID field in the third basic frame overhead) is consistent with the receiving slot for the fine granularity service at the receiving end.

For another example, a RES field in the third basic frame overhead may be for bearing the check indication information. The RES field may be a RES field (2 bits) in the third basic frame overhead, or may be a RES field (9 bits) in the third basic frame overhead.

In a possible implementation of the first aspect, the first information is borne in a reserved RES field of a basic frame overhead. In a possible implementation, the first information may be borne in a reserved RES field of a basic frame overhead. For example, the first information is borne in a reserved RES field (9 bits) of the basic frame overhead, and one or more bits in the reserved RES field (9 bits) are for bearing the first information. For example, when values of a first bit and a second bit of the reserved RES field (9 bits) are 11, the basic frame overhead including the reserved RES field (9 bits) indicates that the receiving slot used by the receiving end to receive the fine granularity service is consistent with the sending slot used by the sending end to send the fine granularity service.

In a possible implementation of the first aspect, the sending end receives third information from the receiving end, where the third information indicates that the receiving slot used by the receiving end to receive the fine granularity service is inconsistent with the sending slot used by the sending end to send the fine granularity service; and the sending end sends fourth information to the receiving end, where the fourth information indicates the receiving end to reconfigure the slot resource of the fine granularity service, so that the receiving slot is consistent with the sending slot.

Specifically, after slot consistency verification performed by the receiving end on the fine granularity service fails, the receiving end sends the third information to the sending end, where the third information indicates that the receiving slot used by the receiving end to receive the fine granularity service is inconsistent with the sending slot used by the sending end to send the fine granularity service. Correspondingly, the sending end receives the third information from the receiving end.

In a possible implementation, the third information may be borne in a reserved RES field of a basic frame overhead. For example, the third information is borne in a reserved RES field (9 bits) of the basic frame overhead, and one or more bits in the reserved RES field (9 bits) are for bearing the third information. For example, when values of a first bit and a second bit of the reserved RES field (9 bits) are 00, the basic frame overhead including the reserved RES field (9 bits) indicates that the receiving slot used by the receiving end to receive the fine granularity service is inconsistent with the sending slot used by the sending end to send the fine granularity service.

After the sending end receives the third information from the receiving end, the sending end sends the fourth information to the receiving end, where the fourth information indicates the receiving end to reconfigure the slot resource of the fine granularity service, so that the receiving slot is consistent with the sending slot.

In a possible implementation, the fourth information includes an identifier of the sending slot for the fine granularity service, and the receiving end learns the N slots occupied by the sending slot based on the fourth information. The receiving end reconfigures the receiving slot for the fine granularity service based on the fourth information, so that the receiving slot is consistent with the sending slot.

Optionally, the fourth information may be borne in a reserved RES field of a basic frame overhead.

In this embodiment of this application, a sending end and a receiving end exchange third information and fourth information, to reconfigure a sending slot and a receiving slot for a fine granularity service, so that the receiving slot is consistent with the sending slot, thereby ensuring normal running of the fine granularity service.

According to a second aspect, an embodiment of this application provides a slot consistency verification method, and including:

a receiving end sends first information to a sending end, where the first information indicates that a receiving slot used by the receiving end to receive a fine granularity service is consistent with a sending slot used by the sending end to send the fine granularity service; and the receiving end receives a data block from the sending end, where the data block includes a first basic frame overhead and a basic frame payload, the basic frame payload is for bearing the fine granularity service, and the fine granularity service is borne in the sending slot.

Specifically, a fine granularity unit frame is also referred to as a fine granularity unit (FGU) frame or an FGU frame. In a fine granularity technology, a time-division multiplexing (TDM) mechanism is used, to cyclically send the fine granularity unit frame in a fixed periodicity, where a quantity and positions of slots in each frame are strictly fixed. Therefore, a sending periodicity of each slot is also deterministic.

The fine granularity unit frame includes an FGU basic unit frame (also referred to as an FGU basic frame, an FGU basic frame, a basic frame, or a unit frame). The FGU basic frame has a fixed length. Each FGU basic frame includes a basic frame overhead (OH) and a basic frame payload. In this embodiment of this application, the basic frame overhead is also referred to as an overhead or an OH. It should be noted that, the FGU basic frame may further include other content. This is not limited in this embodiment of this application.

In this embodiment of this application, after a receiving end performs verification on a slot resource of a fine granularity service, when the verification succeeds, a sending end receives first information from the receiving end, where the first information indicates that a receiving slot used by the receiving end to receive the fine granularity service is consistent with a sending slot used by the sending end to send the fine granularity service. After the sending end receives the first information, the sending end sends a data block to the receiving end, where the data block includes a first basic frame overhead and a basic frame payload, the basic frame payload is for bearing the fine granularity service, and the fine granularity service is borne in the sending slot. By using the foregoing method, it is ensured that the sending slot used by the sending end for the fine granularity service is consistent with the receiving slot used by the receiving end for the fine granularity service, thereby ensuring normal running of the fine granularity service.

In a possible implementation of the second aspect, before a receiving end sends first information to a sending end, the method further includes: The receiving end receives a second basic frame overhead from the sending end, where the second basic frame overhead carries first indication information, and the first indication information indicates that the sending slot has taken effect.

Optionally, a plurality of fields in the second basic frame overhead may be for bearing the first indication information. For example, a C field may be for bearing the first indication information, and the C field is also referred to as a slot effective indicator. When a value of the C field in the second basic frame overhead is 1, the C field is for bearing the first indication information, to be specific, the C field indicates that the sending slot (indicated by a slot identifier sub-slot ID field in the second basic frame overhead) for the fine granularity service (indicated by a client identifier client ID field in the second basic frame overhead) at the sending end has taken effect.

For another example, a RES field in the second basic frame overhead may be for bearing the first indication information. The RES field may be a RES field (2 bits) in the second basic frame overhead, or may be a RES field (9 bits) in the second basic frame overhead.

In a possible implementation, the receiving end receives N second basic frame overheads from the sending end, where the N second basic frame overheads are in a one-to-one correspondence with N pieces of indication information, and the N pieces of indication information are in a one-to-one correspondence with N slots. For example, if a sending slot for a fine granularity service A at the sending end occupies four slots, the sending end sends four second basic frame overheads to the receiving end, where the four second base station overheads are in a one-to-one correspondence with the four slots, and each second basic frame overhead indicates that one slot has taken effect as the sending slot.

In another possible implementation, the receiving end receives one second basic frame overhead from the sending end, where the one second basic frame overhead includes second information, and the second information is for identifying the sending slot. To be specific, the second basic frame overhead including the second information indicates that the sending slot occupying N slots has taken effect. The second information is a cyclic redundancy check (CRC) value generated by the sending end based on the sending slot.

By using the fine granularity service A as an example, the fine granularity service A occupies a slot 3, a slot 5, and a slot 7. The sending end generates a bit string with a length of 480 bits based on the slots occupied by the fine granularity service A. In the bit string of 480 bits, third, fifth, and seventh bits are set to 1, and other bits are set to 0. The sending end performs encoding processing on the bit string to generate a CRC value with a length of 12 bits, and the CRC value is used as the second information.

It may be understood that, that the length of the CRC value is 12 bits is merely an example description, and a length of the second information is not limited in this embodiment of this application. Further, the sending end may further encode the bit string in another encoding manner, to generate an encoding value with another length. The receiving end decodes the encoding value in a corresponding decoding manner. This is not limited herein.

In a possible implementation of the second aspect, the second basic frame overhead includes a C field, and the C field is for bearing the first indication information.

In a possible implementation of the second aspect, before a receiving end sends first information to a sending end, the method further includes: The receiving end receives a third basic frame overhead from the sending end, where the third basic frame overhead indicates the receiving end to check the sending slot, the third basic frame overhead includes second information, and the second information is for identifying the sending slot; and the receiving end checks, based on the third overhead, whether the sending slot is consistent with the receiving slot.

In a possible implementation, the receiving end receives N third basic frame overheads from the sending end, where the N third basic frame overheads are in a one-to-one correspondence with N pieces of indication information, and the N pieces of indication information are in a one-to-one correspondence with N slots. For example, if a sending slot for a fine granularity service A at the sending end occupies four slots, the sending end sends four third basic frame overheads to the receiving end, where the four second base station overheads are in a one-to-one correspondence with the four slots, and each third basic frame overhead indicates that one slot has taken effect as the sending slot.

In another possible implementation, the receiving end receives one third basic frame overhead from the sending end, where the one third basic frame overhead includes the second information. To be specific, the third basic frame overhead including the second information indicates that the sending slot occupying N slots has taken effect.

Optionally, the second information is a cyclic redundancy check (CRC) value generated by the sending end based on the sending slot. Specifically, the sending end first determines a first bit string based on the N slots, where N bits in the first bit string are in a one-to-one correspondence with the N slots. Then, the sending end encodes the first bit string by using a cyclic redundancy check (CRC) algorithm, to generate a CRC value.

In a possible implementation of the second aspect, the second information is a cyclic redundancy check CRC value generated by the sending end based on the sending slot.

In a possible implementation of the second aspect, the third basic frame overhead carries check indication information, and the check indication information indicates that the third basic frame overhead is for checking a slot resource of the fine granularity service.

Further, a plurality of fields in the third basic frame overhead may be for bearing the check indication information. For example, a flag field may be for bearing the check indication information. When a value of the flag field in the third basic frame overhead is 01 or 10, the flag field is for bearing the check indication information, to be specific, the flag field indicates the receiving end to check whether the sending slot (indicated by a client ID field in the third basic frame overhead) for the fine granularity service (indicated by a sub-slot ID field in the third basic frame overhead) is consistent with the receiving slot for the fine granularity service at the receiving end.

For another example, a RES field in the third basic frame overhead may be for bearing the check indication information. The RES field may be a RES field (2 bits) in the third basic frame overhead, or may be a RES field (9 bits) in the third basic frame overhead.

In a possible implementation of the second aspect, the second information is a cyclic redundancy check CRC value generated by the sending end based on the sending slot.

In a possible implementation of the second aspect, the first information is borne in a reserved RES field of a basic frame overhead. In a possible implementation, the first information may be borne in a reserved RES field of a basic frame overhead. For example, the first information is borne in a reserved RES field (9 bits) of the basic frame overhead, and one or more bits in the reserved RES field (9 bits) are for bearing the first information. For example, when values of a first bit and a second bit of the reserved RES field (9 bits) are 11, the basic frame overhead including the reserved RES field (9 bits) indicates that the receiving slot used by the receiving end to receive the fine granularity service is consistent with the sending slot used by the sending end to send the fine granularity service.

In a possible implementation of the second aspect, the receiving end sends third information to the sending end, where the third information indicates that the receiving slot used by the receiving end to receive the fine granularity service is inconsistent with the sending slot used by the sending end to send the fine granularity service; and the receiving end receives fourth information from the sending end, where the fourth information indicates the receiving end to reconfigure the slot resource of the fine granularity service, so that the receiving slot is consistent with the sending slot.

Specifically, after slot consistency verification performed by the receiving end on the fine granularity service fails, the receiving end sends the third information to the sending end, where the third information indicates that the receiving slot used by the receiving end to receive the fine granularity service is inconsistent with the sending slot used by the sending end to send the fine granularity service. Correspondingly, the sending end receives the third information from the receiving end.

In a possible implementation, the third information may be borne in a reserved RES field of a basic frame overhead. For example, the third information is borne in a reserved RES field (9 bits) of the basic frame overhead, and one or more bits in the reserved RES field (9 bits) are for bearing the third information. For example, when values of a first bit and a second bit of the reserved RES field (9 bits) are 00, the basic frame overhead including the reserved RES field (9 bits) indicates that the receiving slot used by the receiving end to receive the fine granularity service is inconsistent with the sending slot used by the sending end to send the fine granularity service.

After the sending end receives the third information from the receiving end, the sending end sends the fourth information to the receiving end, where the fourth information indicates the receiving end to reconfigure the slot resource of the fine granularity service, so that the receiving slot is consistent with the sending slot.

In a possible implementation, the fourth information includes an identifier of the sending slot for the fine granularity service, and the receiving end learns the N slots occupied by the sending slot based on the fourth information. The receiving end reconfigures the receiving slot for the fine granularity service based on the fourth information, so that the receiving slot is consistent with the sending slot.

Optionally, the fourth information may be borne in a reserved RES field of a basic frame overhead.

In this embodiment of this application, a sending end and a receiving end exchange third information and fourth information, to reconfigure a sending slot and a receiving slot for a fine granularity service, so that the receiving slot is consistent with the sending slot, thereby ensuring normal running of the fine granularity service.

According to a third aspect, an embodiment of this application provides a network device, used in a sending end, and including:

- a transceiver module, configured to receive first information from a receiving end, where the first information indicates that a receiving slot used by the receiving end to receive a fine granularity service is consistent with a sending slot used by the sending end to send the fine granularity service; and
- the transceiver module is further configured to send a data block to the receiving end, where the data block includes a first basic frame overhead and a basic frame payload, the basic frame payload is for bearing the fine granularity service, and the fine granularity service is borne in the sending slot.

In a possible implementation, the transceiver module is further configured to send a second basic frame overhead to the receiving end, where the second basic frame overhead carries first indication information, and the first indication information indicates that the sending slot has taken effect.

In a possible implementation, the second basic frame overhead includes a C field, and the C field is for bearing the first indication information.

In a possible implementation, the transceiver module is further configured to send a third basic frame overhead to the receiving end, where the third basic frame overhead indicates the receiving end to check the sending slot, the third basic frame overhead includes second information, and the second information is for identifying the sending slot.

In a possible implementation, the second information is a cyclic redundancy check CRC value generated by the sending end based on the sending slot.

In a possible implementation, the sending slot occupies N slots; and a processing module is configured to determine a first bit string based on the N slots, where N bits in the first bit string are in a one-to-one correspondence with the N slots, and N is an integer greater than or equal to 1; and

- the processing module is further configured to encode the first bit string by using a CRC algorithm, to generate the CRC value.

In a possible implementation, the sending slot occupies N slots; and the transceiver module is further configured to send N third basic frame overheads to the receiving end, where the N third basic frame overheads are in a one-to-one correspondence with N pieces of indication information, the N pieces of indication information are in a one-to-one correspondence with the N slots, each piece of indication information is for identifying each slot, and N is an integer greater than or equal to 1.

In a possible implementation, the third basic frame overhead includes a sub-slot identifier sub-slot ID field, and the sub-slot ID field is for bearing the second information.

In a possible implementation, the third basic frame overhead carries check indication information, and the check indication information indicates that the third basic frame overhead is for checking a slot resource of the fine granularity service.

In a possible implementation, the third basic frame overhead includes: a flag field or a reserved RES field, and the flag field or the reserved RES field is for bearing the check indication information.

In a possible implementation, the first information is borne in a reserved RES field of a basic frame overhead.

In a possible implementation, the transceiver module is further configured to receive third information from the receiving end, where the third information indicates that the receiving slot used by the receiving end to receive the fine granularity service is inconsistent with the sending slot used by the sending end to send the fine granularity service; and

- the transceiver module is further configured to send fourth information to the receiving end, where the fourth information indicates the receiving end to reconfigure the slot resource of the fine granularity service, so that the receiving slot is consistent with the sending slot.

According to a fourth aspect, an embodiment of this application provides a network device, used in a receiving end, and including:

- a transceiver module, configured to send first information to a sending end, where the first information indicates that a receiving slot used by the receiving end to receive a fine granularity service is consistent with a sending slot used by the sending end to send the fine granularity service; and
- the transceiver module is further configured to receive a data block from the sending end, where the data block includes a first basic frame overhead and a basic frame payload, the basic frame payload is for bearing the fine granularity service, and the fine granularity service is borne in the sending slot.

In a possible implementation, the transceiver module is configured to receive a second basic frame overhead from the sending end, where the second basic frame overhead carries first indication information, and the first indication information indicates that the sending slot has taken effect.

In a possible implementation, the second basic frame overhead includes a C field, and the C field is for bearing the first indication information.

In a possible implementation, the transceiver module is further configured to receive a third basic frame overhead from the sending end, where the third basic frame overhead indicates the receiving end to check the sending slot, the third basic frame overhead includes second information, and the second information is for identifying the sending slot; and a processing module is configured to check, based on the third overhead, whether the sending slot is consistent with the receiving slot.

In a possible implementation, the second information is a cyclic redundancy check CRC value generated by the sending end based on the sending slot.

In a possible implementation, the sending slot occupies N slots; and the transceiver module is further configured to receive N third basic frame overheads from the sending end, where the N third basic frame overheads are in a one-to-one correspondence with N pieces of indication information, the N pieces of indication information are in a one-to-one correspondence with the N slots, each piece of indication information is for identifying each slot, and N is an integer greater than or equal to 1.

In a possible implementation, the third basic frame overhead includes a sub-slot identifier sub-slot ID field, and the sub-slot ID field is for bearing the second information.

In a possible implementation, the third basic frame overhead carries check indication information, and the check indication information indicates that the third basic frame overhead is for checking a slot resource of the fine granularity service.

In a possible implementation, the third basic frame overhead includes: a flag field or a reserved RES field, and the flag field or the reserved RES field is for bearing the check indication information.

In a possible implementation, the first information is borne in a reserved RES field of a basic frame overhead.

In a possible implementation, the transceiver module is further configured to send third information to the sending end, where the third information indicates that the receiving slot used by the receiving end to receive the fine granularity service is inconsistent with the sending slot used by the sending end to send the fine granularity service; and the transceiver module is further configured to receive fourth information from the sending end, where the fourth information indicates the receiving end to reconfigure the slot resource of the fine granularity service, so that the receiving slot is consistent with the sending slot.

According to a fifth aspect, an embodiment of this application provides a network device, used in a sending end, and including:

a transceiver, configured to receive first information from a receiving end, where the first information indicates that a receiving slot used by the receiving end to receive a fine granularity service is consistent with a sending slot used by the sending end to send the fine granularity service; and the transceiver is further configured to send a data block to the receiving end, where the data block includes a first basic frame overhead and a basic frame payload, the basic frame payload is for bearing the fine granularity service, and the fine granularity service is borne in the sending slot.

In a possible implementation, the transceiver is further configured to send a second basic frame overhead to the receiving end, where the second basic frame overhead carries first indication information, and the first indication information indicates that the sending slot has taken effect.

In a possible implementation, the second basic frame overhead includes a C field, and the C field is for bearing the first indication information.

In a possible implementation, the transceiver is further configured to send a third basic frame overhead to the receiving end, where the third basic frame overhead indicates the receiving end to check the sending slot, the third basic frame overhead includes second information, and the second information is for identifying the sending slot.

In a possible implementation, the second information is a cyclic redundancy check CRC value generated by the sending end based on the sending slot.

In a possible implementation, the sending slot occupies N slots; and a processor is configured to determine a first bit string based on the N slots, where N bits in the first bit string are in a one-to-one correspondence with the N slots, and N is an integer greater than or equal to 1; and the processor is further configured to encode the first bit string by using a CRC algorithm, to generate the CRC value.

In a possible implementation, the sending slot occupies N slots; and the transceiver is further configured to send N third basic frame overheads to the receiving end, where the N third basic frame overheads are in a one-to-one correspondence with N pieces of indication information, the N pieces of indication information are in a one-to-one correspondence with the N slots, each piece of indication information is for identifying each slot, and N is an integer greater than or equal to 1.

In a possible implementation, the third basic frame overhead includes a sub-slot identifier sub-slot ID field, and the sub-slot ID field is for bearing the second information.

In a possible implementation, the third basic frame overhead carries check indication information, and the check indication information indicates that the third basic frame overhead is for checking a slot resource of the fine granularity service.

In a possible implementation, the third basic frame overhead includes: a flag field or a reserved RES field, and the flag field or the reserved RES field is for bearing the check indication information.

In a possible implementation, the first information is borne in a reserved RES field of a basic frame overhead.

In a possible implementation, the transceiver is further configured to receive third information from the receiving end, where the third information indicates that the receiving slot used by the receiving end to receive the fine granularity service is inconsistent with the sending slot used by the sending end to send the fine granularity service; and the transceiver is further configured to send fourth information to the receiving end, where the fourth information indicates the receiving end to reconfigure the slot resource of the fine granularity service, so that the receiving slot is consistent with the sending slot.

According to a sixth aspect, an embodiment of this application provides a network device, used in a receiving end, and including:

a transceiver, configured to send first information to a sending end, where the first information indicates that a receiving slot used by the receiving end to receive a fine granularity service is consistent with a sending slot used by the sending end to send the fine granularity service, where the transceiver is further configured to receive a data block from the sending end, where the data block includes a first basic frame overhead and a basic frame payload, the basic frame payload is for bearing the fine granularity service, and the fine granularity service is borne in the sending slot.

In a possible implementation, the transceiver is configured to receive a second basic frame overhead from the sending end, where the second basic frame overhead carries first indication information, and the first indication information indicates that the sending slot has taken effect.

In a possible implementation, the second basic frame overhead includes a C field, and the C field is for bearing the first indication information.

In a possible implementation, the transceiver module is further configured to receive a third basic frame overhead from the sending end, where the third basic frame overhead indicates the receiving end to check the sending slot, the third basic frame overhead includes second information, and the second information is for identifying the sending slot; and a processor is configured to check, based on the third overhead, whether the sending slot is consistent with the receiving slot.

In a possible implementation, the second information is a cyclic redundancy check CRC value generated by the sending end based on the sending slot.

In a possible implementation, the sending slot occupies N slots; and the transceiver is further configured to receive N third basic frame overheads from the sending end, where the N third basic frame overheads are in a one-to-one correspondence with N pieces of indication information, the N pieces of indication information are in a one-to-one correspondence with the N slots, each piece of indication information is for identifying each slot, and N is an integer greater than or equal to 1.

In a possible implementation, the third basic frame overhead includes a sub-slot identifier sub-slot ID field, and the sub-slot ID field is for bearing the second information.

In a possible implementation, the third basic frame overhead carries check indication information, and the check indication information indicates that the third basic frame overhead is for checking a slot resource of the fine granularity service.

In a possible implementation, the third basic frame overhead includes: a flag field or a reserved RES field, and the flag field or the reserved RES field is for bearing the check indication information.

In a possible implementation, the first information is borne in a reserved RES field of a basic frame overhead.

In a possible implementation, the transceiver is further configured to send third information to the sending end, where the third information indicates that the receiving slot used by the receiving end to receive the fine granularity service is inconsistent with the sending slot used by the sending end to send the fine granularity service; and the transceiver is further configured to receive fourth information from the sending end, where the fourth information indicates the receiving end to reconfigure the slot resource of the fine granularity service, so that the receiving slot is consistent with the sending slot.

According to a seventh aspect, a communication system is provided, where the communication system includes the network device according to the third aspect or the fourth aspect.

According to an eighth aspect, a communication system is provided, where the communication system includes the network device according to the fifth aspect or the sixth aspect.

According to a ninth aspect, this application provides a computer storage medium. The computer storage medium may be non-volatile. The computer storage medium stores computer-readable instructions. When the computer-readable instructions are executed by a processor, the method according to any one of the implementations of the first aspect or the second aspect is implemented.

According to a tenth aspect, this application provides a computer program product including instructions. When the computer program product is run on a computer, the computer is enabled to perform the method according to any one of the implementations of the first aspect or the second aspect.

According to an eleventh aspect, this application provides a chip system. The chip system includes a processor, configured to support a network device in implementing functions in the foregoing aspects, for example, sending or processing data and/or information in the foregoing methods. In a possible design, the chip system further includes a memory, and the memory is configured to store program instructions and data that are necessary for the network device. The chip system may include a chip, or may include a chip and another discrete component.

BRIEF DESCRIPTION OF DRAWINGS

FIG. 4 is a schematic diagram of an FGU basic frame overhead;

DESCRIPTION OF EMBODIMENTS

Figure 1:
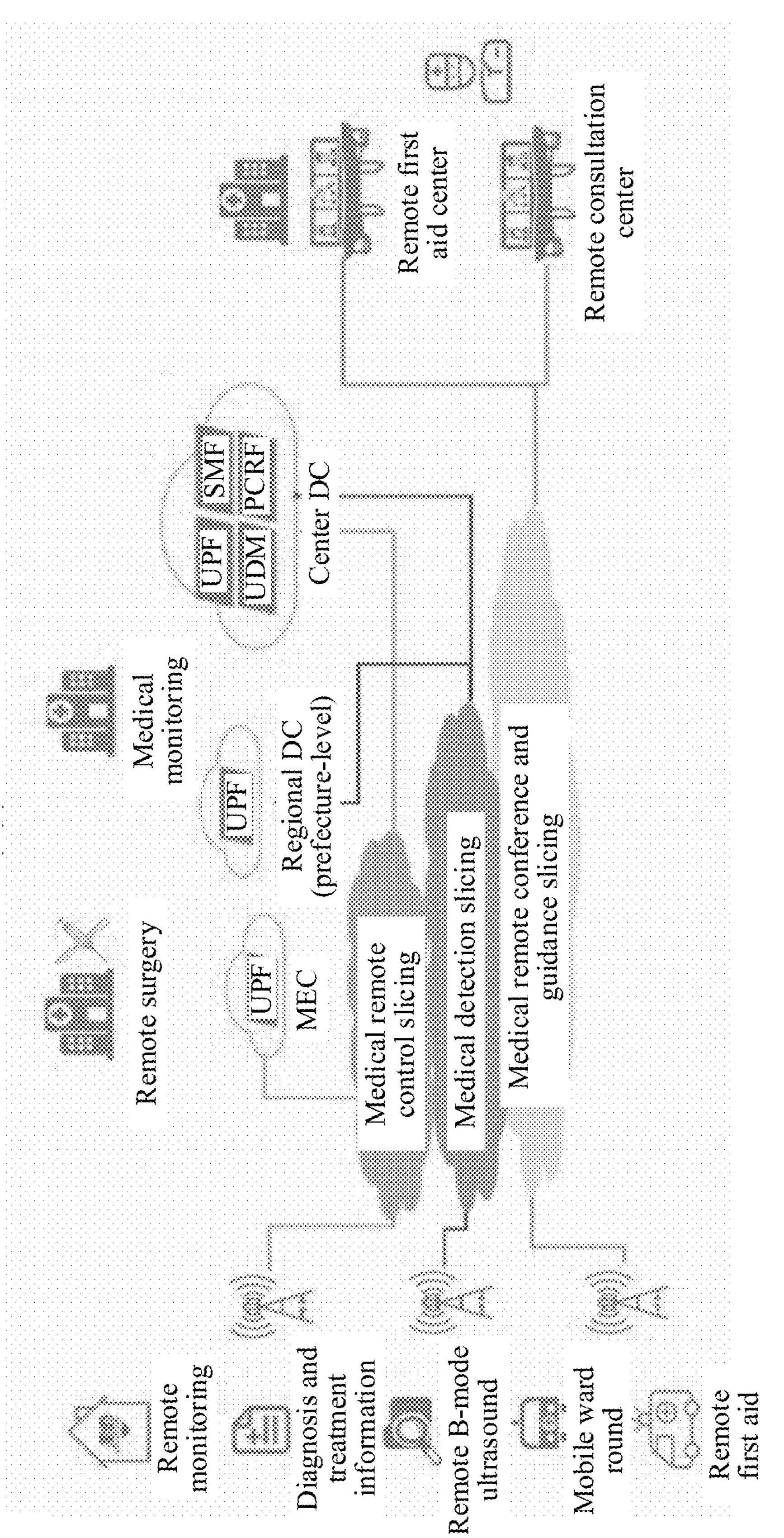
FIG. 1 is a schematic diagram of an application scenario in which a fine granularity technology is applied to smart healthcare.

The following describes embodiments of this application. Apparently, the described embodiments are only some embodiments rather than all embodiments of this application. A person of ordinary skill in the art may learn that, with emergence of a new application scenario, technical solutions provided in embodiments of this application are also applicable to a similar technical problem.

In the specification, claims, and accompanying drawings of this application, the terms "first", "second", and the like are intended to distinguish between similar objects but do not necessarily indicate a specific order or sequence. It should be understood that the descriptions termed in such a way are interchangeable in proper circumstances so that embodiments can be implemented in other orders than the order illustrated or described in this application. In addition, the terms "include", "contain" and any other variants mean to cover the non-exclusive inclusion, for example, a process, method, system, product, or device that includes a list of steps or modules is not necessarily limited to those steps or modules, but may include other steps or modules not expressly listed or inherent to such a process, method, product, or device. Names or numbers of steps in this application do not mean that the steps in the method procedure need to be performed in a time/logical sequence indicated by the names or numbers. An execution sequence of the steps in the procedure that have been named or numbered can be changed based on a technical objective to be achieved, provided that same or similar technical effects can be achieved. Division into the units in this application is logical division. In actual application, there may be another division manner. For example, a plurality of units may be combined or integrated into another system, or some features may be ignored or not performed. In addition, the displayed or discussed mutual coupling or direct coupling or communication connection may be through some ports, and the indirect coupling or communication connection between units may be in an electrical form or another similar form. This is not limited in this application. In addition, the units or subunits described as separate parts may or may not be physically separate, and the parts may or may not be physical units, or may be distributed in a plurality of circuit units. Some or all of the units may be selected according to actual needs to achieve the objectives of the solutions of embodiments of this application.

First, some technical concepts in embodiments of this application are described.

(1) Fine Granularity Technology

In the fine granularity technology, a fine granularity service is borne by a fine granularity unit (FGU). A fine granularity technology inherits a high-efficiency Ethernet kernel of a slicing packet network (SPN), and integrates a fine granularity slicing technology into an overall architecture of the SPN, so that a low-cost, refined, and hard-isolated fine granularity bearer pipe is provided. An FGU is also referred to as an X-Ethernet technology, and corresponds to an International Telecommunication Union-Telecommunication standardization sector (ITU-T) metro transport network (MTN) standard. The FGU fines a granularity of hard slicing from 5 gigabits per second (G-bits per-second, Gbps) to 10 megabits per second (Mbps), to meet differentiated service bearer requirements, for example, a small bandwidth, high isolation, and high security, in scenarios such as a 5th generation mobile communication technology+(5G+) vertical industry application and a private line service.

The following describes an application scenario of the fine granularity technology with reference to the accompanying drawings, for example, a scenario shown in FIG. 1. FIG. 1 is a schematic diagram of an application scenario in which a fine granularity technology is applied to smart medical. Remote medical control services mainly involve remote ultrasound, remote endoscope, remote first aid, even remote surgery, and the like, which have high requirements on real-time performance and security. Such services require a bandwidth of less than or equal to 20 Mbps, an end-to-end one-way delay of less than 20 milliseconds (ms), and high reliability and security, to prevent medical accidents in scenarios such as surgery and first aid due to communication reasons. In this way, typical service features such as a small bandwidth, a deterministic low delay, high reliability, and high security are presented. A fine granularity service scenario may include a plurality of terminal devices and network devices, for example, a mobile edge computing (MEC) device, or a domain controller (DC) at each level; or may include various types of monitoring devices, for example, a mother-to-child wristband, a ventilator, a doctor workstation, or an infusion monitor.

In a smart medical scenario, a plurality of types of slicing may be classified into based on purposes, for example, medical remote control slicing, medical detection slicing, or medical remote conference and guidance slicing. By using the medical remote control slicing as an example, the slicing may include a plurality of service scenarios, for example, remote B-mode ultrasound, remote first aid, and remote surgery. Such services require high reliability and security.

It may be understood that, the fine granularity technology may be further applied to a plurality of scenarios, including but not limited to a power grid, a port, a railway, a private line service, or the like. This is not limited herein.

(2) Fine Granularity Unit Frame

The following describes a specific frame structure of a fine granularity unit. The fine granularity unit frame is also referred to as a fine granularity unit (FGU) frame or an FGU frame. In a fine granularity technology, a time-division multiplexing (TDM) mechanism is used, to cyclically send the fine granularity unit frame in a fixed periodicity, where a quantity and positions of slots in each frame are strictly fixed. Therefore, a sending periodicity of each slot is also deterministic. To support more slot channels with finer granularities and improve bandwidth utilization, a fine granularity service solution uses a multiframe manner to perform slot division on 5 Gbps granularities at an SPN channel layer.

The SPN channel layer is located at a physical coding sublayer (PCS) layer of IEEE 802.3, and uses a PCS64/66B coding format of IEEE 802.3. The fine granularity unit frame uses the same 64/66B encoding format as the SPN channel layer, and encodes and encapsulates an overhead and a payload including a plurality of slots into a sequence of S blocks+D blocks+T blocks with a fixed length.

Figure 2:
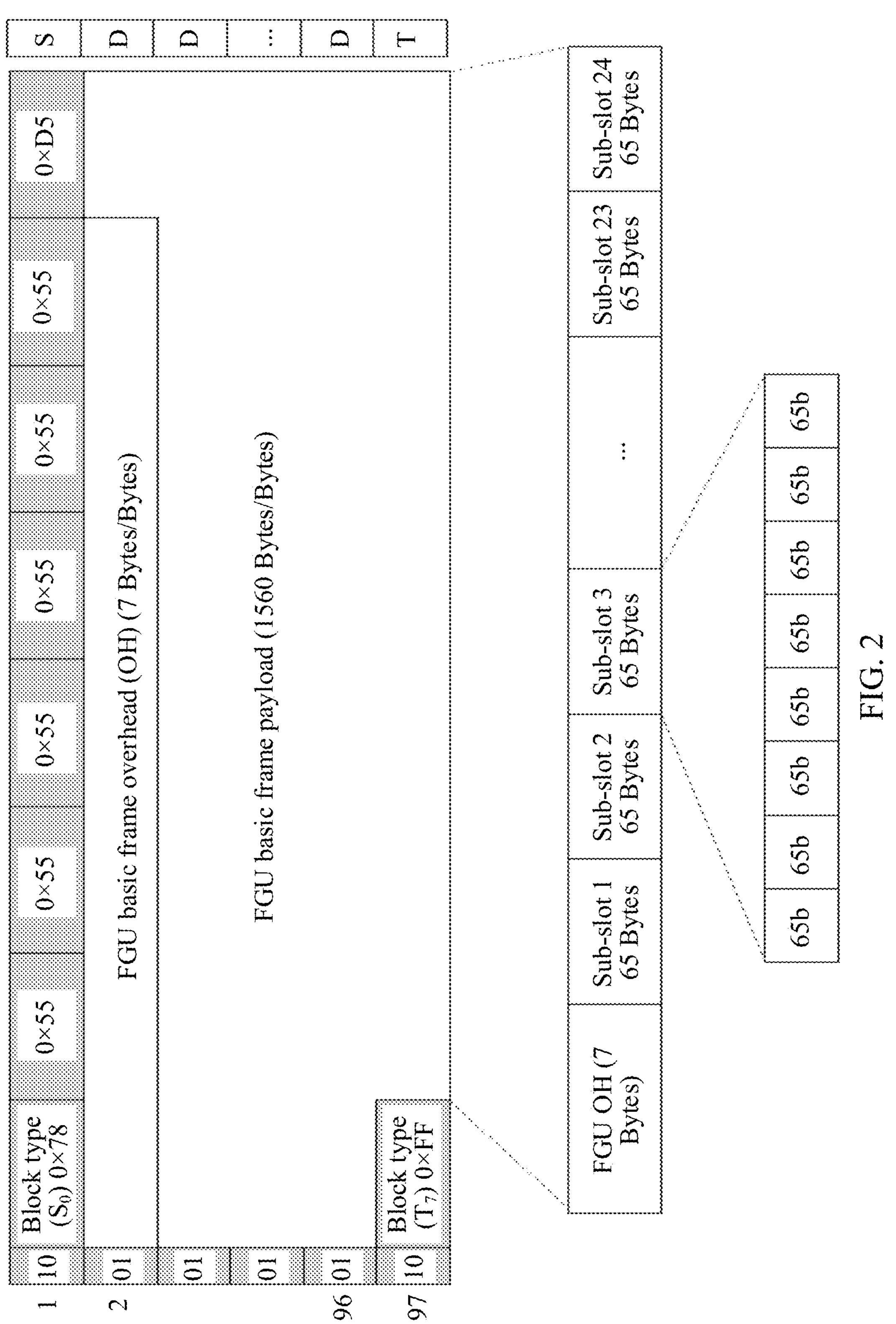
FIG. 2 is a schematic diagram of a structure of an FGU basic frame.
Figure 3:
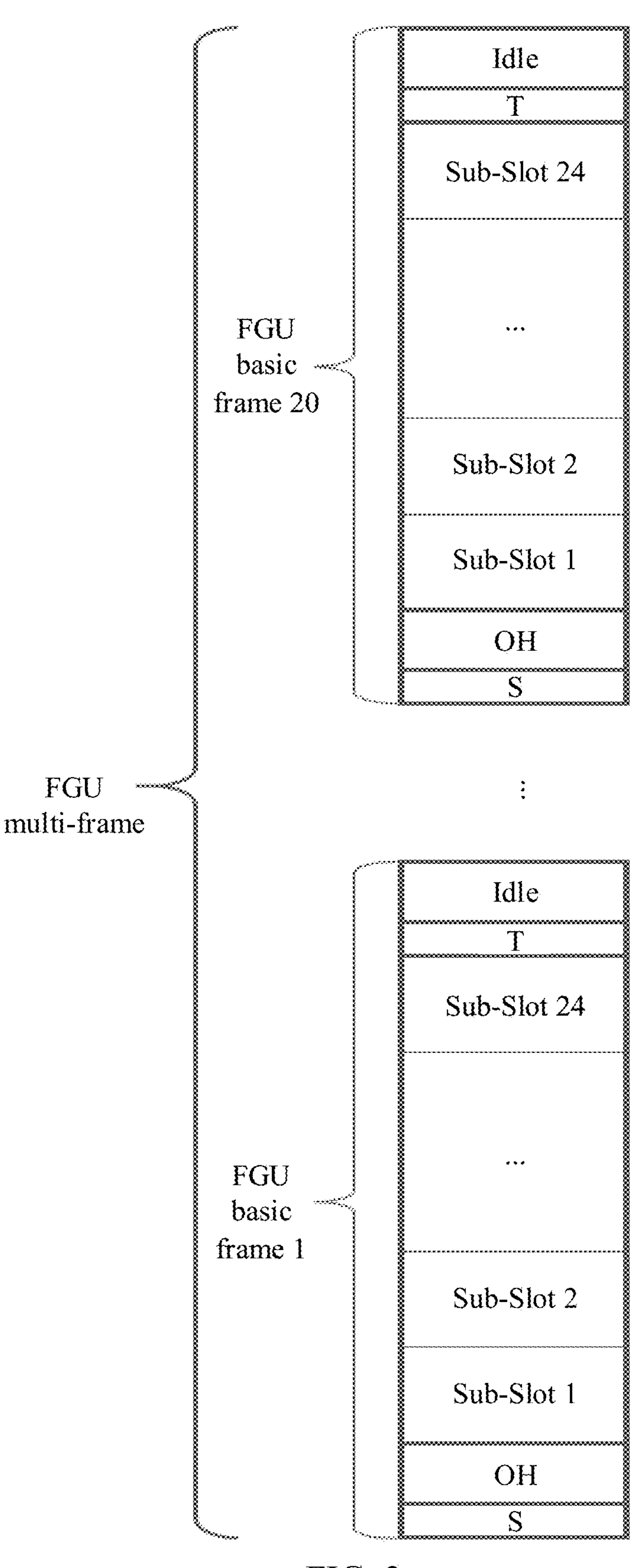
FIG. 3 is a schematic diagram of a structure of an FGU multiframe.

Specifically, the fine granularity unit frame includes an FGU basic unit frame (also referred to as an FGU basic frame, an FGU basic frame, a basic frame, or a unit frame). The FGU basic frame has a fixed length, and includes one start block (S0), 195 data blocks (D), and one end block (T7), namely, 197 66B blocks in total. The 195 data blocks and the one end block (T7) of the FGU unit frame provide 1567(195×8+7)-byte data content, including a 7-byte overhead and a 1560-byte payload. The payload is divided into 24 slots (Sub-Slots) of a same size. The 66B blocks from a service are compressed from 66B to 65B and then filled into the sub-slot payload. Each slot (Sub-Slot) is 65 bytes and may bear eight 65-bit blocks. Specifically, refer to FIG. 2. FIG. 2 is a schematic diagram of a structure of an FGU basic frame. For an FGU multiframe, refer to FIG. 3. FIG. 3 is a schematic diagram of a structure of an FGU multiframe. One FGU multiframe includes 20 FGU basic frames, each FGU basic frame supports 24 slots, and one 5 Gbps granularity at the SPN channel layer supports 480 slots. Each FGU basic frame includes a basic frame overhead (OH) and a basic frame payload. In this embodiment of this application, the basic frame overhead is also referred to as an overhead or an OH. It should be noted that, the FGU basic frame may further include other content. This is not limited in this embodiment of this application.

A length of the overhead included in each FGU basic frame is 56 bits. Refer to FIG. 4. FIG. 4 is a schematic diagram of an FGU basic frame overhead. The overhead includes: a multiframe indicator (MFI), a flag field, a reserved (RES) field, and an overhead information area. Specific descriptions are as follows:

The multiframe indicator (MFI) has a length of 6 bits, and indicates a number of each basic frame in an FGU multiframe. For a first basic frame in the multiframe, a value of the MFI is 0. For basic frames after the first basic frame, the values of the MFIs are increased by 1 in sequence.

The flag field indicates a purpose of a bit after a CA field in the overhead. The flag field is also referred to as an overhead channel usage indication field.

The overhead information area includes: a slot increase adjustment announcement (S field), a slot effective indicator (C field), a change answer (CA) field (where the CA field is also referred to as a slot adjustment response field), a change request (CR) field (where the CR field is also referred to as a slot adjustment request field), a general communication channel (GCC), a client identifier (client ID), a slot identifier (sub-slot ID), and a cyclic redundancy check (CRC).

(3) Bandwidth Adjustment

Figure 5:
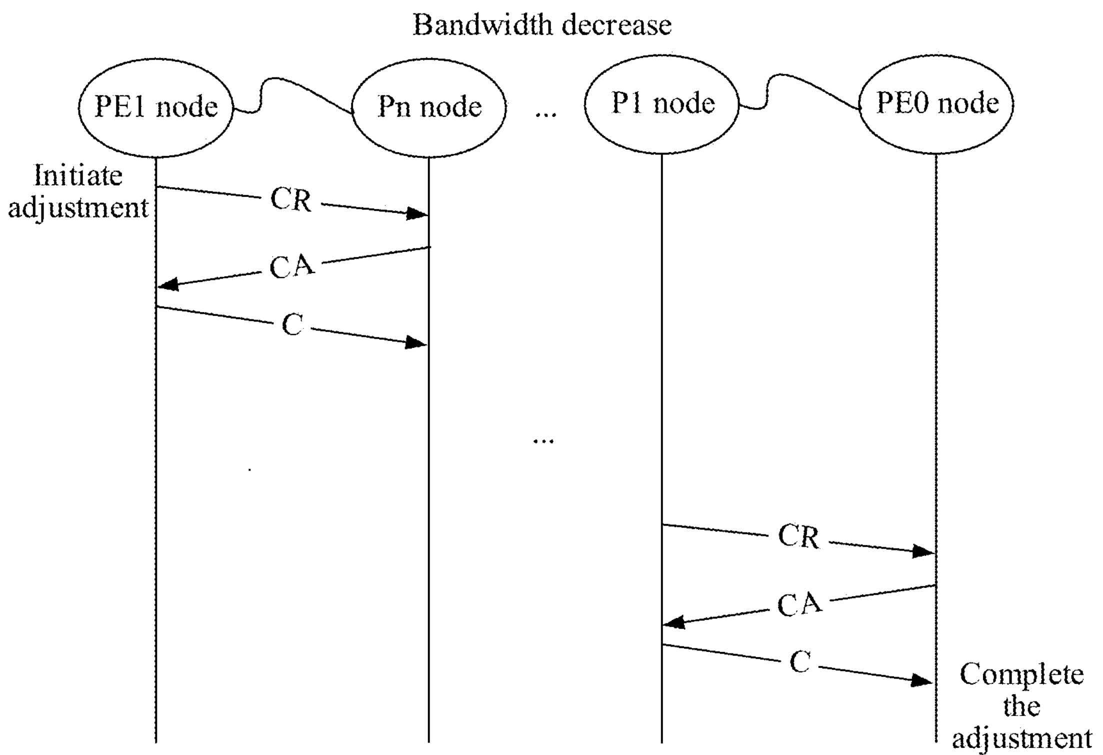
FIG. 5 and FIG. 6 are schematic flowcharts of bandwidth adjustment for a fine granularity service.
Figure 6:
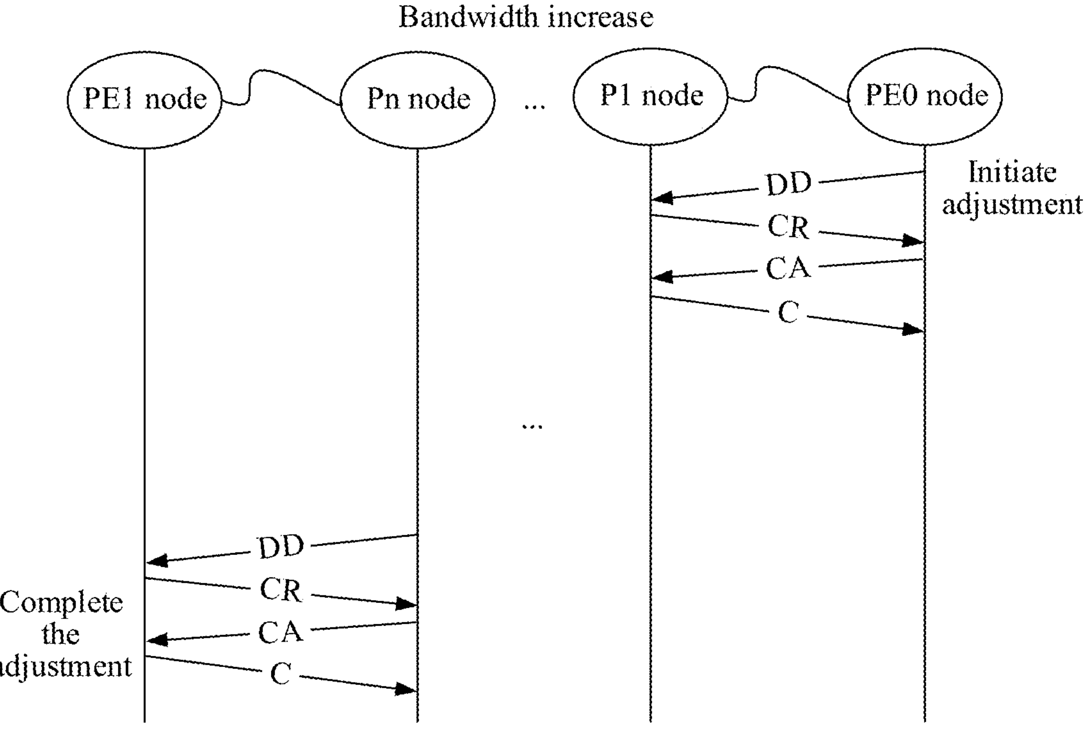

The following describes a bandwidth adjustment procedure for a fine granularity service with reference to FIG. 5 to FIG. 6. FIG. 5 and FIG. 6 are schematic flowcharts of bandwidth adjustment for a fine granularity service. For example, an example in which an application scenario includes a PE1 node, n intermediate nodes (a Pn node to a P1 node), a PE0 node, and a controller (not shown in the figure) is used for description, where n is an integer greater than 1. In the service scenario, a data flow direction is that the PE1 node is a data ingress, the PE0 node is a data egress, and data of the PE1 node is sent to the PE0 node through the Pn node to the P1 node.

(3.1) Bandwidth Decrease

Refer to FIG. 5. FIG. 5 shows a bandwidth decrease procedure. First, the controller delivers service bandwidth adjustment information to all nodes on a service path. The PET node sends an FGU basic frame to the Pn node based on the service bandwidth adjustment information, where the FGU frame includes an OH whose CR field is 1. If the CR field in the OH is 1 and a client ID is 0, it indicates that the OH indicates a next-hop node to reduce a bandwidth of the fine granularity service. A sub-slot ID field in the OH carries an identifier of a slot that needs to be reduced for the fine granularity service. For example, the fine granularity service originally uses a slot 1, a slot 2, a slot 3, and a slot 4, and each sub-slot occupies a bandwidth of 10 Mbps. When the service bandwidth adjustment information indicates that the bandwidth of the fine granularity service needs to be reduced to 30 Mbps, the PET node determines, based on the service bandwidth adjustment information, that slot resources used by the fine granularity service are changed to the slot 1, the slot 2, and the slot 3 (in other words, one slot is reduced for use). The sub-slot ID field in the OH sent by the PET node to the Pn node carries an identifier of the slot 4. For ease of description, the OH whose CR field is 1 is also referred to as CR.

After receiving the CR, the Pn node learns that the bandwidth of the fine granularity service needs to be reduced, and therefore feeds back an OH to the PE0 node, where a value of a CA field in the OH is 1. A sub-slot ID field in the OH carries the identifier of the slot 4. For ease of description, the OH whose CA field is 1 is also referred to as CA.

After receiving the CA from the Pn node, the PET node switches a slot table of the fine granularity service. Specifically, the PET node switches from an original slot table (where the original slot table includes the slot 1, the slot 2, the slot 3, and the slot 4) to a new slot table (where the new slot table includes the slot 1, the slot 2, and the slot 3).

After slot table switching is completed, the PET node sends an OH to the Pn node, where a C field in the OH is 1, and the OH indicates that the PET node has completed the bandwidth decrease of the fine granularity service. For ease of description, the OH whose C field is 1 is also referred to as C. After receiving the OH, the Pn node adjusts the bandwidth of the fine granularity service. Specifically, a procedure of exchange between the Pn node and the Pn−1 node is similar to a procedure of exchange between the PET node and the Pn node. Details are not described herein again.

After the P1 node receives C of a previous-hop node (for example, a P2 node), the P1 node starts to adjust the bandwidth of the fine granularity service. Specifically, the P1 node sends CR to the PE0 node, the PE0 node sends CA to the P1 node based on the CR, and the P1 node switches the slot table of the fine granularity service based on the CA and then sends C to the PE0 node. Bandwidth adjustment for the fine granularity service is completed through the foregoing procedure.

(3.2) Bandwidth Increase

Refer to FIG. 6. FIG. 6 shows a bandwidth increase procedure. First, the controller delivers service bandwidth adjustment information to all nodes on a service path. The PET node sends an FGU basic frame to the P1 node based on the service bandwidth adjustment information, where the FGU frame includes an OH whose S field is 1. If the S field in the OH is 1 and a client ID is not 0, it indicates that the OH indicates a previous-hop node to increase a bandwidth of the fine granularity service. For ease of description, the OH whose S field is 1 is also referred to as DD. A sub-slot ID field in the OH carries an identifier of a slot that needs to be increased for the fine granularity service. For example, the fine granularity service originally uses a slot 1, a slot 2, and a slot 3, and each sub-slot occupies a bandwidth of 10 Mbps. When the service bandwidth adjustment information indicates that the bandwidth of the fine granularity service needs to be increased to 40 Mbps, the PET node determines, based on the service bandwidth adjustment information, that slot resources used by the fine granularity service are changed to the slot 1, the slot 2, the slot 3, and a slot 4 (in other words, one slot is increased for use). The sub-slot ID field in the OH sent by the PET node to the P1 node carries an identifier of the slot 4.

After receiving the DD, the P1 node learns that the bandwidth of the fine granularity service needs to be increased, and therefore feeds back an OH to the PET node, where a value of a CR field in the OH is 1. A sub-slot ID field in the OH carries the identifier of the slot 4. For ease of description, the OH whose CR field is 1 is also referred to as CR.

After receiving the CR, the PET node feeds back an OH to the PET node, where a value of a CA field in the OH is 1. A sub-slot ID field in the OH carries the identifier of the slot 4. For ease of description, the OH whose CA field is 1 is also referred to as CA.

After receiving the CA from the PET node, the P1 node switches a slot table of the fine granularity service. Specifically, the PET node switches from an original slot table (where the original slot table includes the slot 1, the slot 2, and the slot 3) to a new slot table (where the new slot table includes the slot 1, the slot 2, the slot 3, and the slot 4).

After slot table switching is completed, the P1 node sends an OH to the PET node, where a C field in the OH is 1, and the OH indicates that the P1 node has completed the bandwidth decrease of the fine granularity service. For ease of description, the OH whose C field is 1 is also referred to as C. After receiving the OH, the PET node adjusts the bandwidth of the fine granularity service.

After bandwidth adjustment for the fine granularity service is completed, the P1 node sends DD to a previous-hop node (for example, a P2 node). Specifically, a procedure of exchange between the P1 node and the P2 node is similar to a procedure of exchange between the PE1 node and the Pn node. Details are not described herein again.

After the PE1 node receives DD of a next-hop node (for example, the Pn node), the PE1 node starts to adjust the bandwidth of the fine granularity service. A specific procedure is similar to that of bandwidth adjustment between the PE0 node and the P1 node. Bandwidth adjustment for the fine granularity service is completed through the foregoing procedure.

In the foregoing procedure, due to instability of a link, transmission of an OH exchanged between an upstream node and a downstream node may fail. As a result, the upstream node and the downstream node use inconsistent slots for a specific fine granularity service, and then the fine granularity service cannot be normally run. Based on this, embodiments of this application provide a slot consistency verification method. A sending end receives first information from a receiving end, where the first information indicates that a receiving slot used by the receiving end to receive a fine granularity service is consistent with a sending slot used by the sending end to send the fine granularity service; and the sending end sends a data block to the receiving end, where the data block includes a first basic frame overhead and a basic frame payload, the basic frame payload is for bearing the fine granularity service, and the fine granularity service is borne in the sending slot. By using the foregoing method, it is ensured that the sending slot used by the sending end for the fine granularity service is consistent with the receiving slot used by the receiving end for the fine granularity service, thereby ensuring normal running of the fine granularity service.

Figure 7:
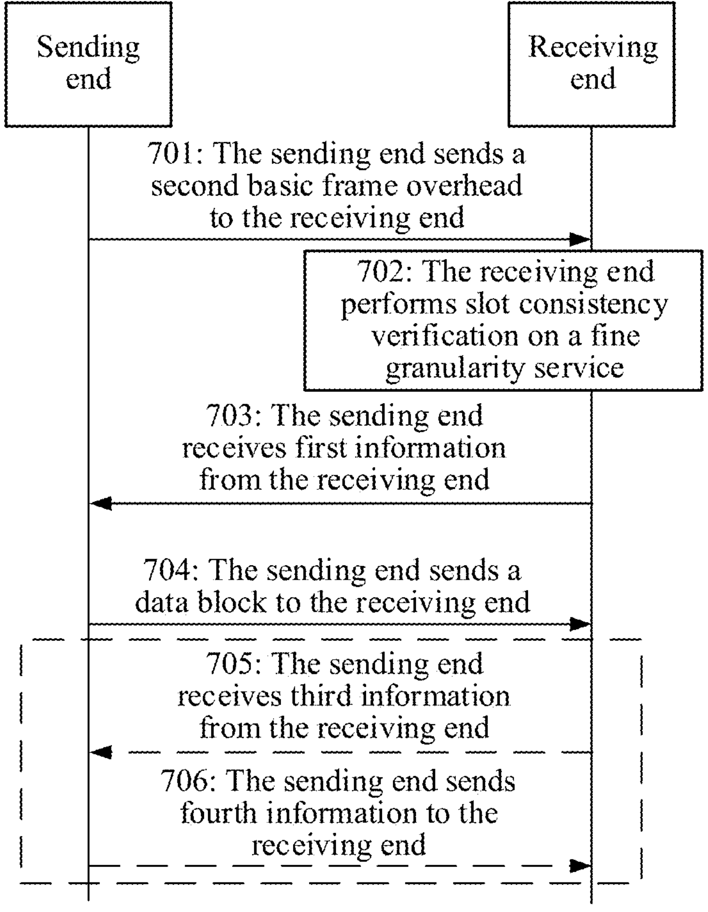
FIG. 7 is a schematic diagram of an embodiment of a slot consistency verification method according to an embodiment of this application.

The following describes embodiments of this application with reference to the accompanying drawings. Specifically, in embodiments of this application, two types of basic frame overheads are designed for slot consistency verification, and are separately described in embodiments shown in FIG. 7 and FIG. 8. Refer to FIG. 7. FIG. 7 is a schematic diagram of an embodiment of a slot consistency verification method according to an embodiment of this application. It should be noted that, if a sending end in this embodiment of this application may be used as an upstream node in a communication network, a receiving end is used as a downstream node in the communication network. The slot consistency verification method provided in this embodiment of this application includes the following steps.

701: A sending end sends a second basic frame overhead to a receiving end.

In step 701, the sending end sends the second basic frame overhead to the receiving end, where the second basic frame overhead carries first indication information, and the first indication information indicates that a sending slot used by the sending end for a fine granularity service has taken effect.

In a possible implementation, a format of the second basic frame overhead is similar to that of a basic frame overhead shown in FIG. 4. The second basic frame overhead includes: a RES field (2 bits), an MFI field, a flag field, a RES field (2 bits), an S field, a C field, a CR field, a CA field, a client ID field, a sub-slot ID field, a RES field (9 bits), and a CRC field.

Optionally, a plurality of fields in the second basic frame overhead may be for bearing the first indication information. For example, the C field may be for bearing the first indication information. When a value of the C field in the second basic frame overhead is 1, the C field is for bearing the first indication information, to be specific, the C field indicates that the sending slot (indicated by the sub-slot ID field in the second basic frame overhead) for the fine granularity service (indicated by the client ID field in the second basic frame overhead) at the sending end has taken effect.

For another example, a RES field in the second basic frame overhead may be for bearing the first indication information. The RES field may be a RES field (2 bits) in the second basic frame overhead, or may be a RES field (9 bits) in the second basic frame overhead.

Further, the sending slot for the fine granularity service at the sending end occupies N slots, where N is an integer greater than or equal to 1. The second basic frame overhead has a plurality of implementations, which are separately described below.

In a possible implementation, the sending end sends N second basic frame overheads, where the N second basic frame overheads are in a one-to-one correspondence with N pieces of indication information, and the N pieces of indication information are in a one-to-one correspondence with the N slots. For example, if a sending slot for a fine granularity service A at the sending end occupies four slots, the sending end sends four second basic frame overheads to the receiving end, where the four second base station overheads are in a one-to-one correspondence with the four slots, and each second basic frame overhead indicates that one slot has taken effect as the sending slot.

Figures 8, 9:
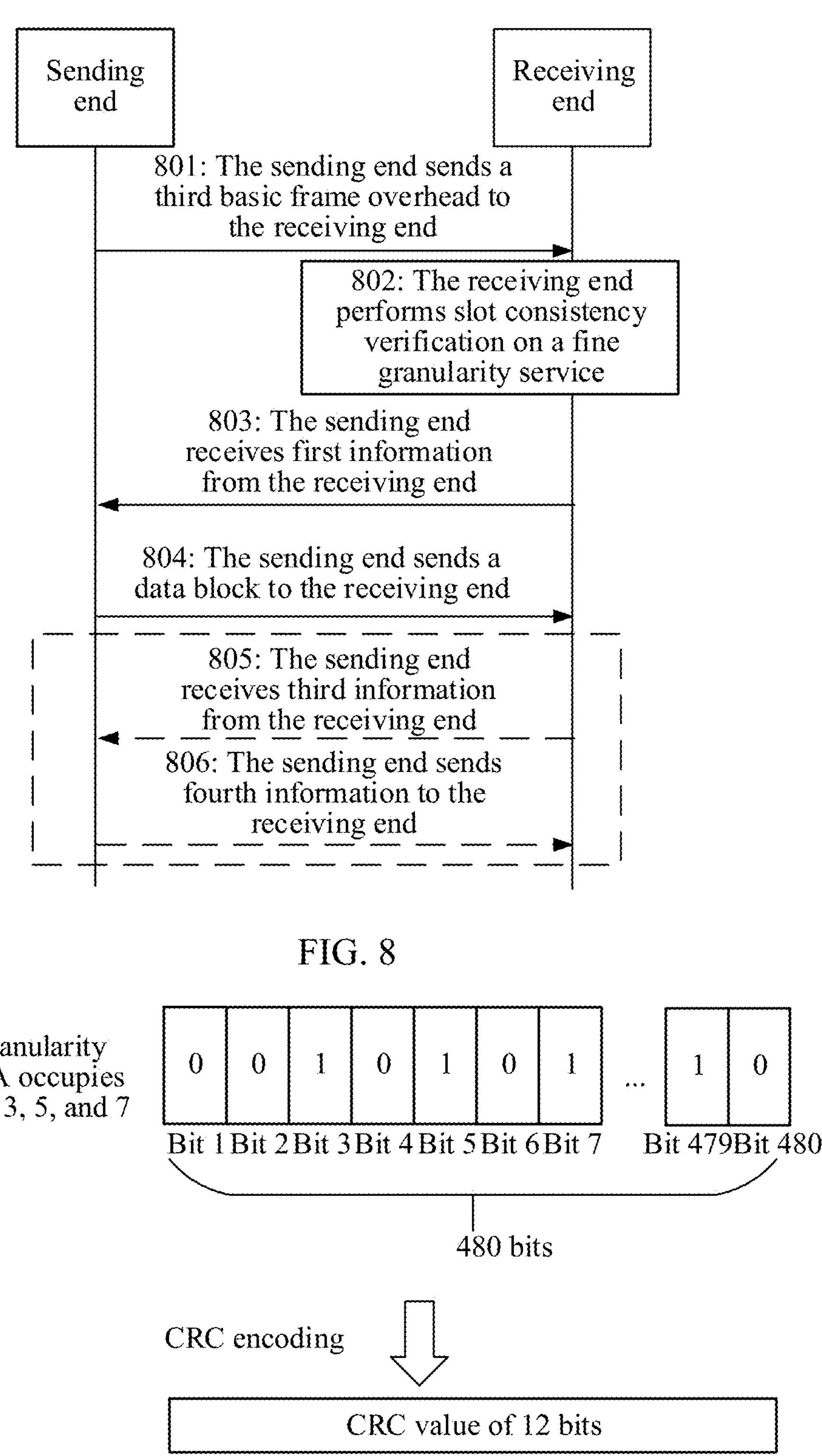
FIG. 8 is a schematic diagram of an embodiment of a slot consistency verification method according to an embodiment of this application.
FIG. 9 is a schematic diagram of generating second information according to an embodiment of this application.

In another possible implementation, the sending end sends one second basic frame overhead, where the one second basic frame overhead includes second information, and the second information is for identifying the sending slot. To be specific, the second basic frame overhead including the second information indicates that the sending slot occupying N slots has taken effect. The second information is a cyclic redundancy check CRC value generated by the sending end based on the sending slot. Refer to FIG. 9. FIG. 9 is a schematic diagram of generating second information according to an embodiment of this application. By using the fine granularity service A as an example, the fine granularity service A occupies a slot 3, a slot 5, and a slot 7. The sending end generates a bit string with a length of 480 bits based on the slots occupied by the fine granularity service A. In the bit string of 480 bits, third, fifth, and seventh bits are set to 1, and other bits are set to 0. The sending end performs encoding processing on the bit string to generate a CRC value with a length of 12 bits, and the CRC value is used as the second information.

It may be understood that, that the length of the CRC value is 12 bits is merely an example description, and a length of the second information is not limited in this embodiment of this application. Further, the sending end may further encode the bit string in another encoding manner, to generate an encoding value with another length. This is not limited herein.

Optionally, the second information is borne in the sub-slot identifier sub-slot ID field in the second basic frame overhead. The sub-slot ID field in the second basic frame overhead is for identifying the N slots. Specifically, the sending end first generates a group of bit strings based on the N slots, where N bits in the bit string are in a one-to-one correspondence with the N slots. Then, the sending end encodes the bit string by using a cyclic redundancy check (CRC) algorithm, to generate a CRC value, and fills the CRC value into the sub-slot ID field of the second basic frame overhead. After receiving the second basic frame overhead, the receiving end obtains, by decoding the sub-slot ID field, slots that have taken effect in the sending slot. For example, the sending slot for the fine granularity service A at the sending end occupies four slots. The sending end first generates a bit string with a length of 480 bits based on the four slots. In the bit string, bits of the four slots are set to 1, and other bits are set to 0. Then, the sending end encodes the bit string by using the CRC algorithm, to generate a CRC value. Then, the sending end fills the CRC value into the sub-slot ID field of the second basic frame overhead, where the CRC value indicates that the four slots occupied by the sending slot for the fine granularity service A have taken effect.

After the receiving end receives the second basic frame overhead from the sending end, the receiving end learns, based on the second basic frame overhead, the sending slot used by the sending end to send the fine granularity service.

Optionally, the receiving end may trigger slot consistency verification on the fine granularity service based on an indication of the second basic frame overhead, in other words, enter step 702. The receiving end performs consistency verification on the sending slot borne by the sending end and a receiving slot borne by the receiving end for the fine granularity service. In a possible implementation, the second basic frame overhead includes check indication information, and the check indication information indicates that the second basic frame overhead is for checking a slot resource of the fine granularity service. Optionally, the second basic frame overhead includes a flag field or a reserved RES field, and the flag field or the reserved RES field is for bearing the check indication information. For example, when a value of the flag field is 10 or 01, the flag field is the check indication information.

It should be noted that, when the second basic frame overhead does not include the check indication information, the receiving end may periodically perform slot consistency verification on the fine granularity service. For example, slot consistency verification is performed on the fine granularity service every 10 seconds or 30 seconds.

The receiving end may also obtain the sending slot for the fine granularity service at the sending end in another manner. This is not limited herein.

702: The receiving end performs slot consistency verification on the fine granularity service.

In step 702, the receiving end performs consistency verification on the sending slot borne by the sending end and the receiving slot borne by the receiving end for the fine granularity service.

There are a plurality of methods for performing slot consistency verification on the fine granularity service. In a possible implementation, after obtaining the sending slot of the sending end, the receiving end generates a bit string A with a length of 480 bits based on the sending slot, where the bit string A indicates slots occupied by the sending slot. The receiving end generates a bit string B with a length of 480 bits based on the receiving slot, where the bit string B indicates slots occupied by the receiving slot. Then, the receiving end determines whether the bit string A is consistent with the bit string B. If the bit string A is consistent with the bit string B, the slot consistency verification performed by the receiving end on the fine granularity service succeeds. If the bit string A is inconsistent with the bit string B, the slot consistency verification performed by the receiving end on the fine granularity service A fails.

In still another possible implementation, after generating a bit string A, the receiving end further encodes the bit string A to obtain a CRC value A. Alternatively, the receiving end obtains, from the second basic frame overhead (or the third basic frame overhead) from the sending end, a CRC value (where the CRC value is referred to as the CRC value A) generated based on the sending slot. After generating a bit string B, the receiving end further encodes the bit string B to obtain a CRC value B. Then, the receiving end determines whether the CRC value A is consistent with the CRC value B. If the CRC value A is consistent with the CRC value B, the slot consistency verification performed by the receiving end on the fine granularity service succeeds. If the CRC value A is inconsistent with the CRC value B, the slot consistency verification performed by the receiving end on the fine granularity service A fails.

The following provides an example for description. An example in which the fine granularity service includes a fine granularity service A, a fine granularity service B, and a fine granularity service C is used. The receiving end sequentially performs slot consistency verification on the fine granularity services. In other words, after completing slot consistency verification on the fine granularity service A, the receiving end performs slot consistency verification on the fine granularity service B, and so on. By using the fine granularity service A as an example, the receiving end performs verification on whether a receiving slot for the fine granularity service is consistent with a sending slot for the fine granularity service at the sending end.

For example, if the sending slot includes a slot A, a slot B, and a slot C; and the receiving slot includes the slot A, the slot B, and the slot C, the slot consistency verification performed by the receiving end on the fine granularity service A succeeds. Steps 703 and 704 are entered.

For another example, if the sending slot includes a slot A, a slot B, and a slot C; and the receiving slot includes the slot A, the slot B, and a slot D, the slot consistency verification performed by the receiving end on the fine granularity service A fails. Optionally, steps 705 and 706 are entered.

703: The sending end receives first information from the receiving end.

In step 703, after the slot consistency verification performed by the receiving end on the fine granularity service succeeds, the receiving end sends the first information to the sending end, where the first information indicates that the receiving slot used by the receiving end to receive the fine granularity service is consistent with the sending slot used by the sending end to send the fine granularity service. Correspondingly, the sending end receives the first information from the receiving end.

In a possible implementation, the first information may be borne in a reserved RES field of a basic frame overhead. For example, the first information is borne in a reserved RES field (9 bits) shown in FIG. 4, and one or more bits in the reserved RES field (9 bits) are for bearing the first information. For example, when values of a first bit and a second bit of the reserved RES field (9 bits) are 11, the basic frame overhead including the reserved RES field (9 bits) indicates that the receiving slot used by the receiving end to receive the fine granularity service is consistent with the sending slot used by the sending end to send the fine granularity service.

704: The sending end sends a data block to the receiving end.

In step 704, because the sending end learns, based on the first information, that the receiving slot of the receiving end is consistent with the sending slot of the sending end, the sending end confirms that the fine granularity service can be smoothly run. The sending end sends the data block to the receiving end, where the data block includes a first basic frame overhead and a basic frame payload, the basic frame payload is for bearing the fine granularity service, and the fine granularity service is borne in the sending slot.

705: The sending end receives third information from the receiving end.

In step 705, after the slot consistency verification performed by the receiving end on the fine granularity service fails, the receiving end sends the third information to the sending end, where the third information indicates that the receiving slot used by the receiving end to receive the fine granularity service is inconsistent with the sending slot used by the sending end to send the fine granularity service. Correspondingly, the sending end receives the third information from the receiving end.

In a possible implementation, the third information may be borne in a reserved RES field of a basic frame overhead. For example, the third information is borne in a reserved RES field (9 bits) shown in FIG. 4, and one or more bits in the reserved RES field (9 bits) are for bearing the third information. For example, when values of a first bit and a second bit of the reserved RES field (9 bits) are 00, the basic frame overhead including the reserved RES field (9 bits) indicates that the receiving slot used by the receiving end to receive the fine granularity service is inconsistent with the sending slot used by the sending end to send the fine granularity service.

It should be noted that, step 705 is an optional step.

706: The sending end sends fourth information to the receiving end.

In step 706, after the sending end receives the third information from the receiving end, the sending end sends the fourth information to the receiving end, where the fourth information indicates the receiving end to reconfigure the slot resource of the fine granularity service, so that the receiving slot is consistent with the sending slot.

In a possible implementation, the fourth information includes an identifier of the sending slot for the fine granularity service, and the receiving end learns the N slots occupied by the sending slot based on the fourth information. The receiving end reconfigures the receiving slot for the fine granularity service based on the fourth information, so that the receiving slot is consistent with the sending slot.

Optionally, the fourth information may be borne in a reserved RES field of a basic frame overhead.

It should be noted that, step 706 is an optional step.

In this embodiment of this application, a sending end sends a second basic frame overhead to a receiving end, where the second basic frame overhead carries first indication information, and the first indication information indicates that a sending slot used by the sending end for a fine granularity service has taken effect. After the receiving end performs verification on a slot resource of the fine granularity service, when the verification succeeds, the sending end receives first information from the receiving end, where the first information indicates that a receiving slot used by the receiving end to receive the fine granularity service is consistent with the sending slot used by the sending end to send the fine granularity service. After the sending end receives the first information, the sending end sends a data block to the receiving end, where the data block includes a first basic frame overhead and a basic frame payload, the basic frame payload is for bearing the fine granularity service, and the fine granularity service is borne in the sending slot. By using the foregoing method, it is ensured that the sending slot used by the sending end for the fine granularity service is consistent with the receiving slot used by the receiving end for the fine granularity service, thereby ensuring normal running of the fine granularity service.

Next, refer to FIG. 8. FIG. 8 is a schematic diagram of an embodiment of a slot consistency verification method according to an embodiment of this application. It should be noted that, if a sending end in this embodiment of this application may be used as an upstream node in a communication network, a receiving end is used as a downstream node in the communication network. The slot consistency verification method provided in this embodiment of this application includes the following steps.

801: A sending end sends a third basic frame overhead to a receiving end.

In step 801, the sending end sends the third basic frame overhead to the receiving end, where the third basic frame overhead carries second information, and the second information is for identifying a sending slot.

In a possible implementation, a format of the third basic frame overhead is similar to that of a basic frame overhead shown in FIG. 4. The third basic frame overhead includes: a RES field (2 bits), an MFI field, a flag field, a RES field (2 bits), an S field, a C field, a CR field, a CA field, a client ID field, a sub-slot ID field, a RES field (9 bits), and a CRC field.

Further, the sending slot for the fine granularity service at the sending end occupies N slots, where N is an integer greater than or equal to 1. The third basic frame overhead has a plurality of implementations, which are separately described below.

In a possible implementation, the sending end sends N third basic frame overheads, where the N third basic frame overheads are in a one-to-one correspondence with N pieces of indication information, and the N pieces of indication information are in a one-to-one correspondence with N slots. For example, if a sending slot for a fine granularity service A at the sending end occupies four slots, the sending end sends four third basic frame overheads to the receiving end, where the four second base station overheads are in a one-to-one correspondence with the four slots, and each third basic frame overhead indicates that one slot has taken effect as the sending slot.

In another possible implementation, the sending end sends one third basic frame overhead, where the one third basic frame overhead includes the second information. To be specific, the third basic frame overhead including the second information indicates that the sending slot occupying N slots has taken effect.

Optionally, the second information is a cyclic redundancy check CRC value generated by the sending end based on the sending slot. Specifically, the sending end first generates a group of bit strings based on the N slots, where N bits in the bit string are in a one-to-one correspondence with the N slots. Then, the sending end encodes the bit string by using a cyclic redundancy check (CRC) algorithm, to generate a CRC value.

Optionally, the second information is borne in the sub-slot identifier sub-slot ID field in the third basic frame overhead. The sub-slot ID field in the third basic frame overhead is for identifying the N slots. Specifically, the sending end fills the CRC value into the sub-slot ID field of the third basic frame overhead. After receiving the third basic frame overhead, the receiving end obtains, by decoding the sub-slot ID field, slots that have taken effect in the sending slot. For example, the sending slot for the fine granularity service A at the sending end occupies four slots. The sending end first generates a bit string with a length of 480 bits based on the four slots. In the bit string, bits of the four slots are set to 1, and other bits are set to 0. Then, the sending end encodes the bit string by using the CRC algorithm, to generate a CRC value. Then, the sending end fills the CRC value into the sub-slot ID field of the third basic frame overhead, where the CRC value indicates that the four slots occupied by the sending slot for the fine granularity service A have taken effect.

Optionally, the third basic frame overhead carries check indication information, and the check indication information indicates that the third basic frame overhead is for checking a slot resource of the fine granularity service.

Further, a plurality of fields in the third basic frame overhead may be for bearing the check indication information. For example, a flag field may be for bearing the check indication information. When a value of the flag field in the third basic frame overhead is 01 or 10, the flag field is for bearing the check indication information, to be specific, the flag field indicates the receiving end to check whether the sending slot (indicated by a client ID field in the third basic frame overhead) for the fine granularity service (indicated by a sub-slot ID field in the third basic frame overhead) is consistent with the receiving slot for the fine granularity service at the receiving end.

For another example, a RES field in the third basic frame overhead may be for bearing the check indication information. The RES field may be a RES field (2 bits) in the third basic frame overhead, or may be a RES field (9 bits) in the third basic frame overhead.

After the receiving end receives the third basic frame overhead from the sending end, the receiving end learns, based on the third basic frame overhead, the sending slot used by the sending end to send the fine granularity service. The receiving end may trigger slot consistency verification on the fine granularity service based on an indication of the third basic frame overhead, in other words, enter step 802.

When the third basic frame overhead does not include the check indication information, the receiving end may periodically perform slot consistency verification on the fine granularity service. For example, slot consistency verification is performed on the fine granularity service every 10 seconds or 30 seconds.

The receiving end may also obtain the sending slot for the fine granularity service at the sending end in another manner. This is not limited herein.

802: The receiving end performs slot consistency verification on the fine granularity service.

803: The sending end receives first information from the receiving end.

804: The sending end sends a data block to the receiving end.

805: The sending end receives third information from the receiving end.

806: The sending end sends fourth information to the receiving end.

Steps 802 to 806 are consistent with steps 702 to 706. Details are not described herein again.

In this embodiment of this application, a sending end sends a third basic frame overhead to a receiving end, where the third basic frame overhead carries second information, and the second information is for identifying a sending slot. After the receiving end performs verification on a slot resource of the fine granularity service, when the verification succeeds, the sending end receives first information from the receiving end, where the first information indicates that a receiving slot used by the receiving end to receive the fine granularity service is consistent with the sending slot used by the sending end to send the fine granularity service. After the sending end receives the first information, the sending end sends a data block to the receiving end, where the data block includes a first basic frame overhead and a basic frame payload, the basic frame payload is for bearing the fine granularity service, and the fine granularity service is borne in the sending slot. By using the foregoing method, it is ensured that the sending slot used by the sending end for the fine granularity service is consistent with the receiving slot used by the receiving end for the fine granularity service, thereby ensuring normal running of the fine granularity service.

Figure 10:
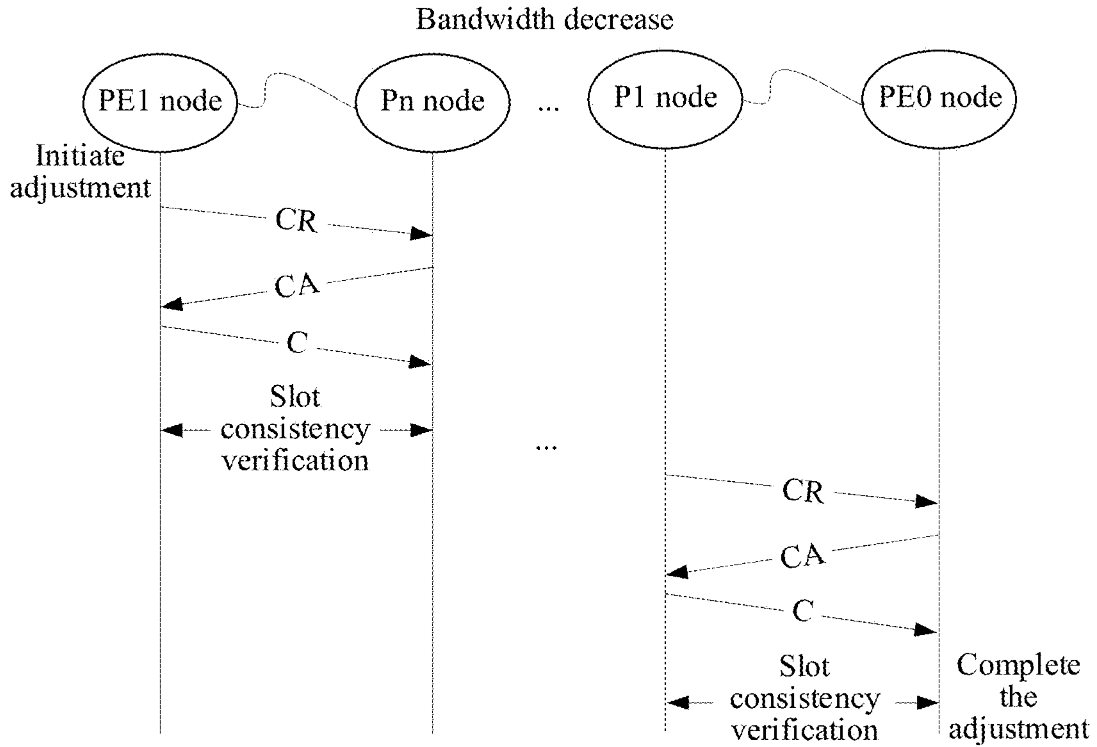
FIG. 10 to FIG. 12 are schematic flowcharts of an application scenario according to an embodiment of this application.
Figure 11:
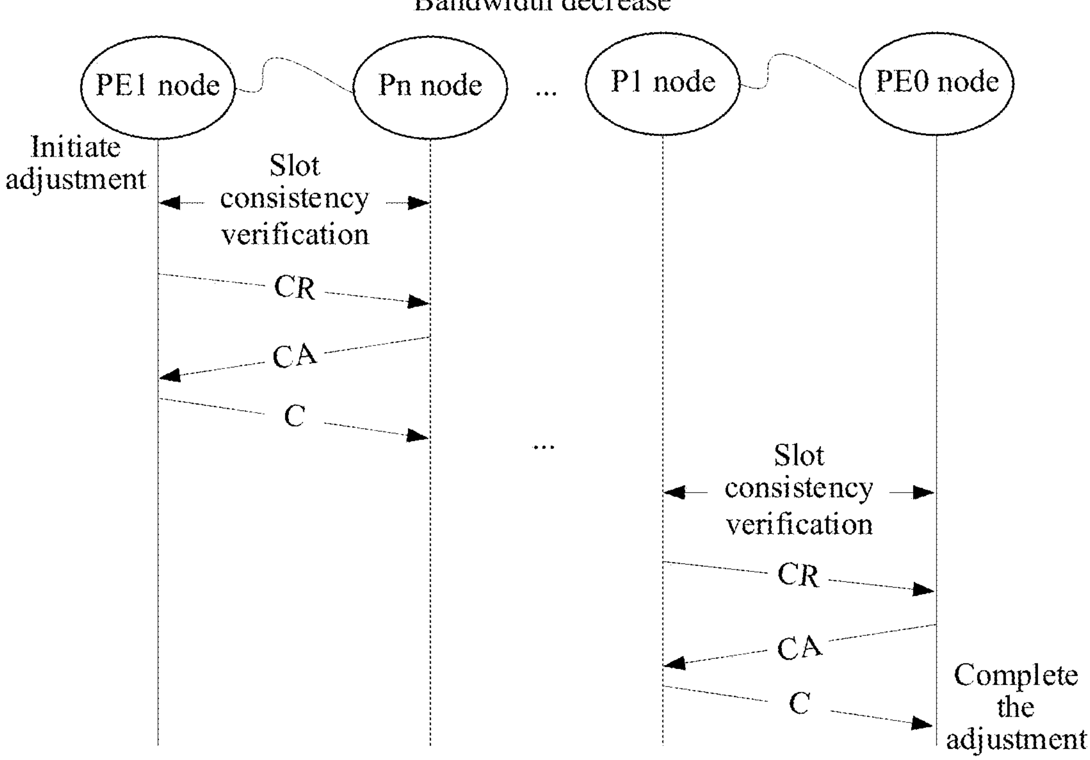
Figure 12:
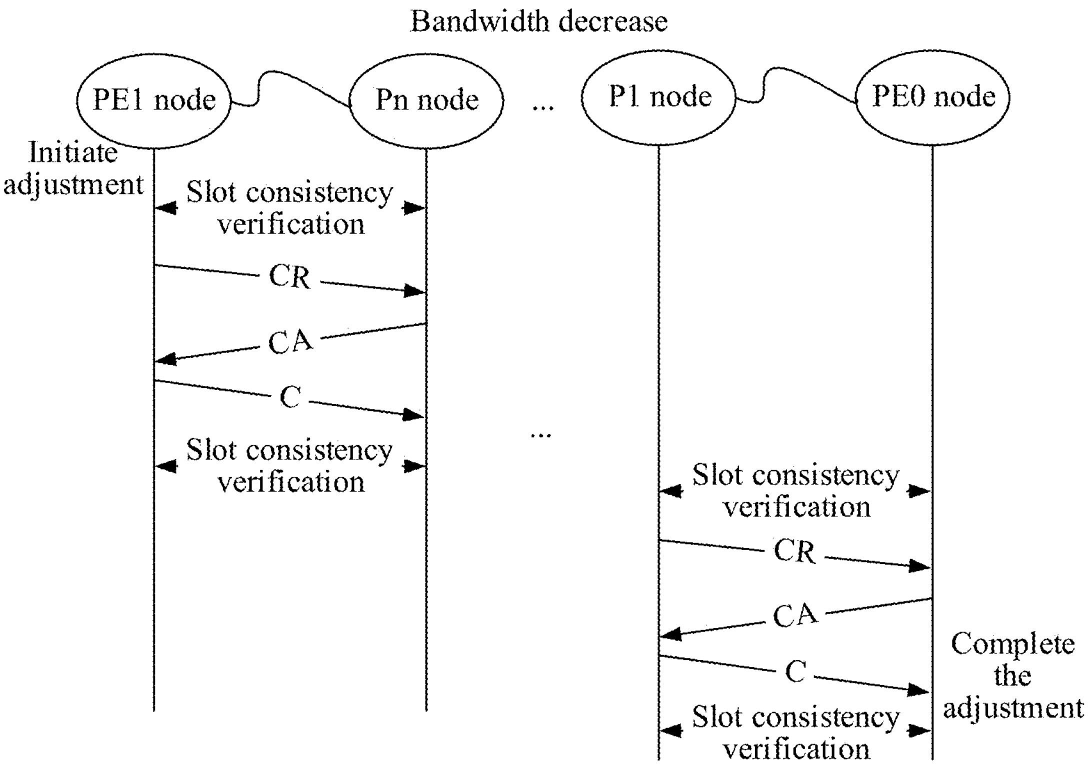

Based on the foregoing embodiments, the following describes an application scenario provided in embodiments of this application. First, a bandwidth decrease scenario of a fine granularity service is used as an example for description. Refer to FIG. 10 to FIG. 12. FIG. 10 to FIG. 12 are schematic flowcharts of an application scenario according to an embodiment of this application.

Specifically, FIG. 10 shows that, in a bandwidth decrease scenario, after completing bandwidth adjustment with an adjacent node (namely, a downstream node), an upstream node performs slot consistency verification. A specific procedure of the slot consistency verification is consistent with that in the embodiment shown in FIG. 7 or FIG. 8. Details are not described herein again. After the slot consistency verification is completed and a sending slot of an upstream node (for example, a PET node) is consistent with a receiving slot of a downstream node (for example, a Pn node), bandwidth adjustment for the fine granularity service between the Pn node and a Pn−1 node is triggered, and so on, until a P1 node and a PE0 node complete slot consistency verification. In this case, bandwidth adjustment for the fine granularity service is completed.

FIG. 11 shows that, in a bandwidth decrease scenario, before performing bandwidth adjustment with an adjacent node (namely, a downstream node), an upstream node performs slot consistency verification. A specific procedure of the slot consistency verification is consistent with that in the embodiment shown in FIG. 7 or FIG. 8. Details are not described herein again. After the slot consistency verification is completed and a sending slot of an upstream node (for example, a PET node) is consistent with a receiving slot of a downstream node (for example, a Pn node), bandwidth adjustment between the upstream node (for example, the PET node) and the downstream node (for example, the Pn node) is triggered. After the upstream node completes the bandwidth adjustment for the fine granularity service, slot consistency verification on the fine granularity service between a next-hop node and an adjacent node, for example, slot consistency verification on the fine granularity service between a Pn node and a Pn−1 node, is triggered, and so on, until a P1 node and a PE0 node complete slot consistency verification. In this case, bandwidth adjustment for the fine granularity service is completed.

FIG. 12 shows that, in a bandwidth decrease scenario, before performing bandwidth adjustment with an adjacent node (namely, a downstream node), an upstream node performs slot consistency verification, and performs slot consistency verification again after completing the bandwidth adjustment. A specific procedure of the slot consistency verification is consistent with that in the embodiment shown in FIG. 7 or FIG. 8. Details are not described herein again. After the slot consistency verification is completed and a sending slot of an upstream node (for example, a PE1 node) is consistent with a receiving slot of a downstream node (for example, a Pn node), bandwidth adjustment between the upstream node (for example, the PE1 node) and the downstream node (for example, the Pn node) is triggered. After the bandwidth adjustment between the upstream node (for example, the PE1 node) and the downstream node (for example, the Pn node) is completed, the slot consistency verification on the fine granularity service between the upstream node (for example, the PE1 node) and the downstream node (for example, the Pn node) is performed again. After the slot consistency verification succeeds, slot consistency verification on the fine granularity service between a next-hop node and an adjacent node, for example, slot consistency verification on the fine granularity service between a Pn node and a Pn−1 node, is triggered, and so on, until a P1 node and a PE0 node complete slot consistency verification. In this case, bandwidth adjustment for the fine granularity service is completed.

Figure 13:
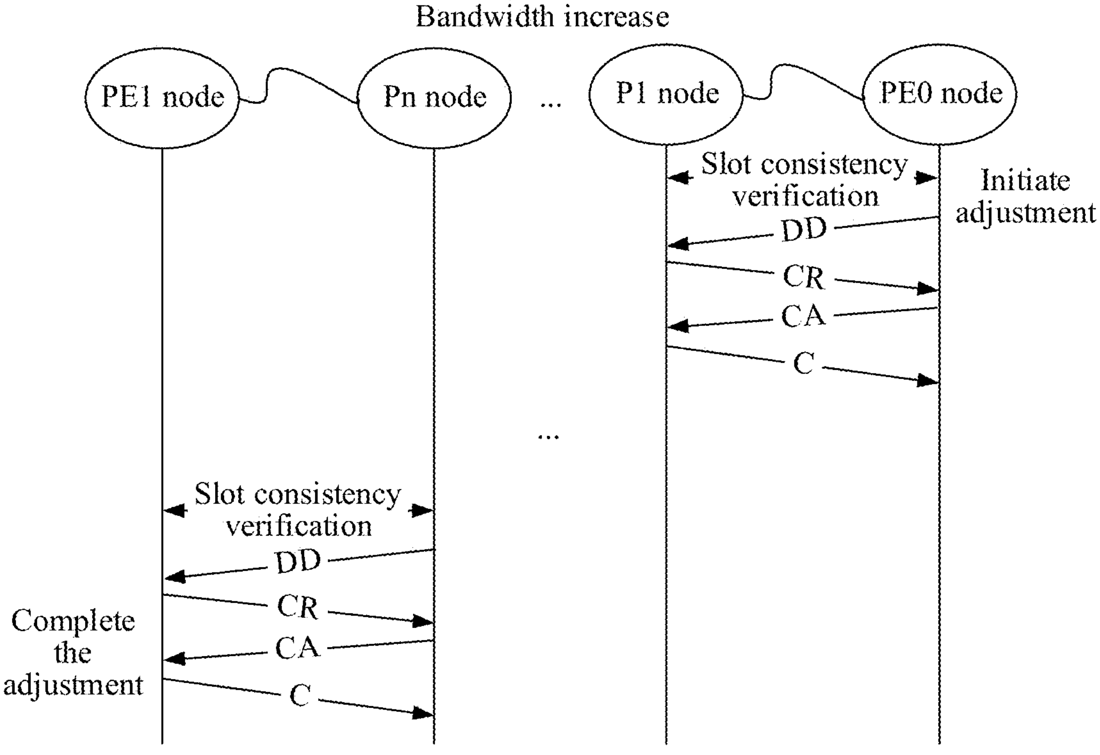
FIG. 13 to FIG. 15 are schematic flowcharts of an application scenario according to an embodiment of this application.
Figure 14:
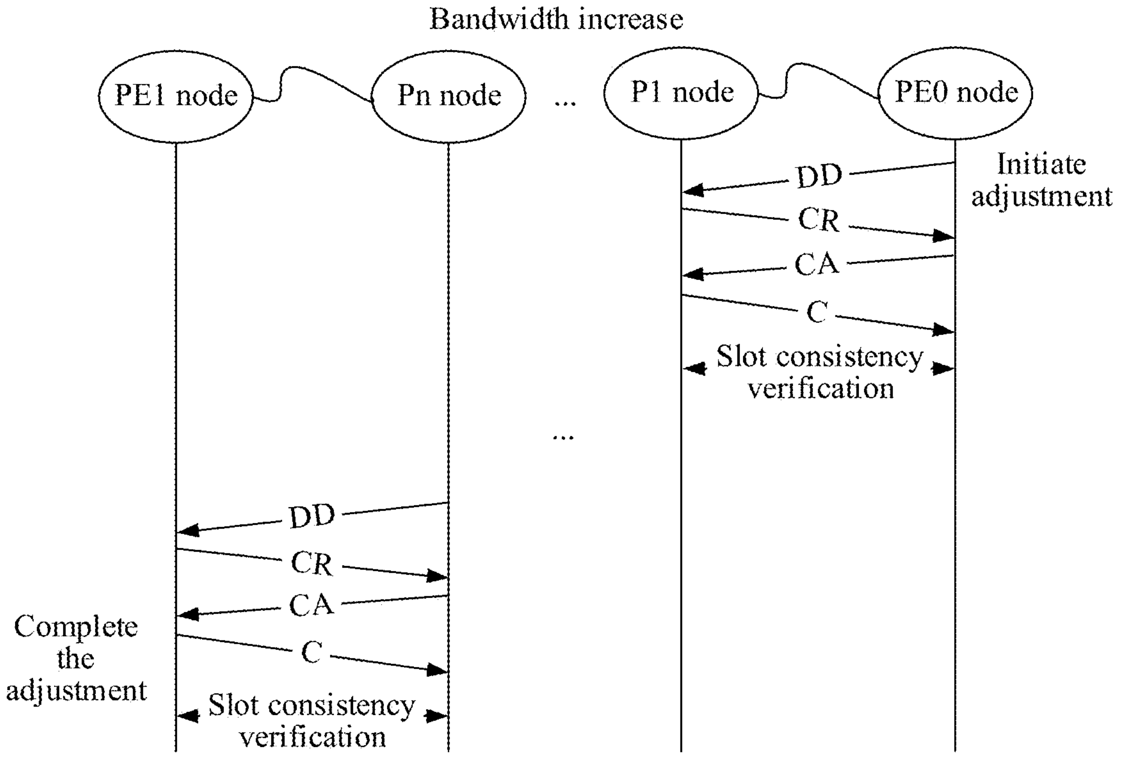
Figure 15:
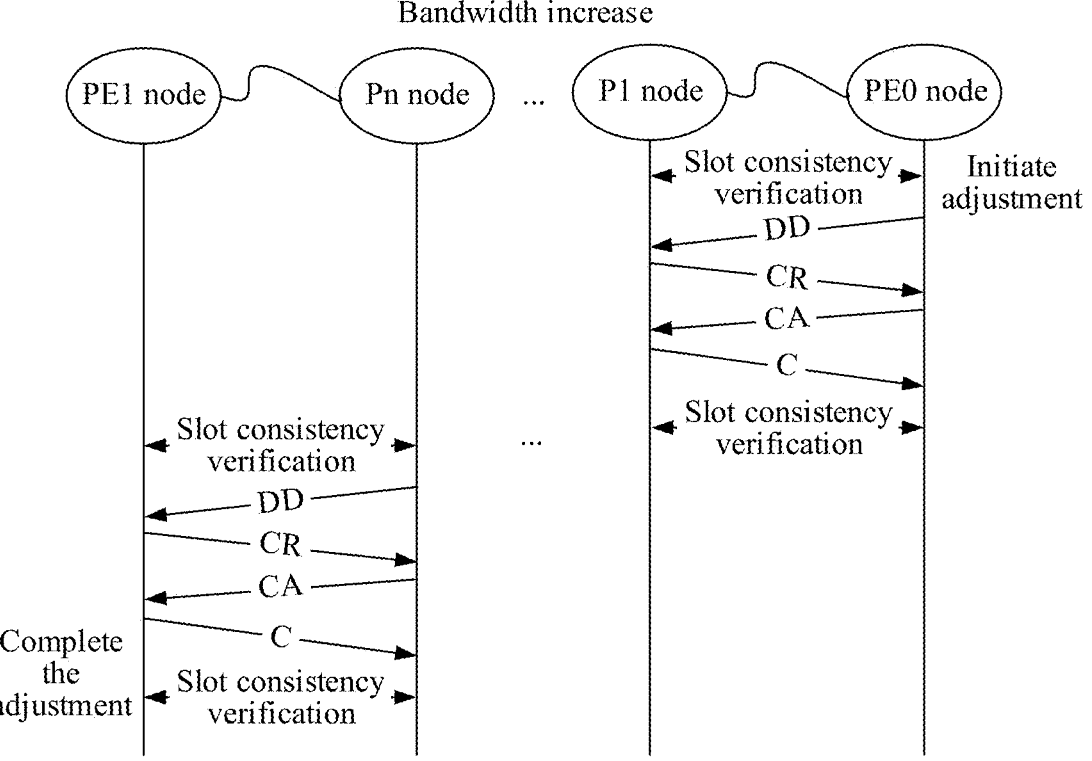

Similar to the application scenario shown in FIG. 10 to FIG. 12, the following uses a bandwidth increase scenario of a granularity service as an example for description. Refer to FIG. 13 to FIG. 15. FIG. 13 to FIG. 15 are schematic flowcharts of an application scenario according to an embodiment of this application. A specific procedure is similar to that in FIG. 10 to FIG. 12. Details are not described herein again.

The foregoing mainly describes the solutions provided in embodiments of this application from a perspective of a method. It may be understood that, to implement the foregoing functions, a network device includes a corresponding hardware structure and/or software module for performing each function. A person skilled in the art should easily be aware that, in combination with modules and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions of each particular application, but it should not be considered that the implementation goes beyond the scope of this application.

In embodiments of this application, the network device may be divided into function modules based on the foregoing method examples. For example, function modules corresponding to the functions may be obtained through division, or two or more functions may be integrated into one processing module. The integrated module may be implemented in a form of hardware, or may be implemented in a form of a software functional module. It should be noted that, in embodiments of this application, module division is an example, and is merely a logical function division. During actual implementation, another division manner may be used.

The following describes the network device in embodiments of this application. The network device described below has any function of the sending end or the receiving end in the foregoing method embodiments.

Figure 16:
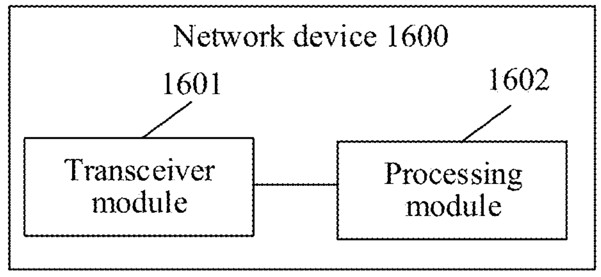
FIG. 16 is a schematic diagram of a structure of a network device 1600 according to an embodiment of this application.

FIG. 16 is a schematic diagram of a structure of a network device 1600 according to an embodiment of this application. As shown in FIG. 16, the network device 1600 includes: a transceiver module 1601, configured to perform step 701, 703, 704, 705, or 706; and a processing module 1602, configured to perform step 702.

For another example, the transceiver module 1601 is configured to perform step 801, 803, 804, 805, or 806; and the processing module 1602 is configured to perform step 802.

The network device 1600 may correspond to the sending end and the receiving end in the foregoing method embodiments. Units and the foregoing other operations and/or functions in the network device 1600 are respectively used to implement various steps and methods implemented by the sending end, the receiving end, or the controller in the method embodiments. For specific details, refer to the foregoing method embodiments. For brevity, details are not described herein again.

When the network device 1600 processes a data block, division of the foregoing functional modules is merely used as an example for description. In actual application, the foregoing functions may be allocated to different functional modules for implementation according to a requirement, in other words, an internal structure of the network device 1600 is divided into different functional modules, to implement all or some of the functions described above. In addition, the network device 1600 provided in the foregoing embodiment belongs to a same concept as the method in the embodiment corresponding to FIG. 7 or FIG. 8. For a specific implementation process of the network device 1600, refer to the foregoing method embodiment. Details are not described herein again.

Figure 17:
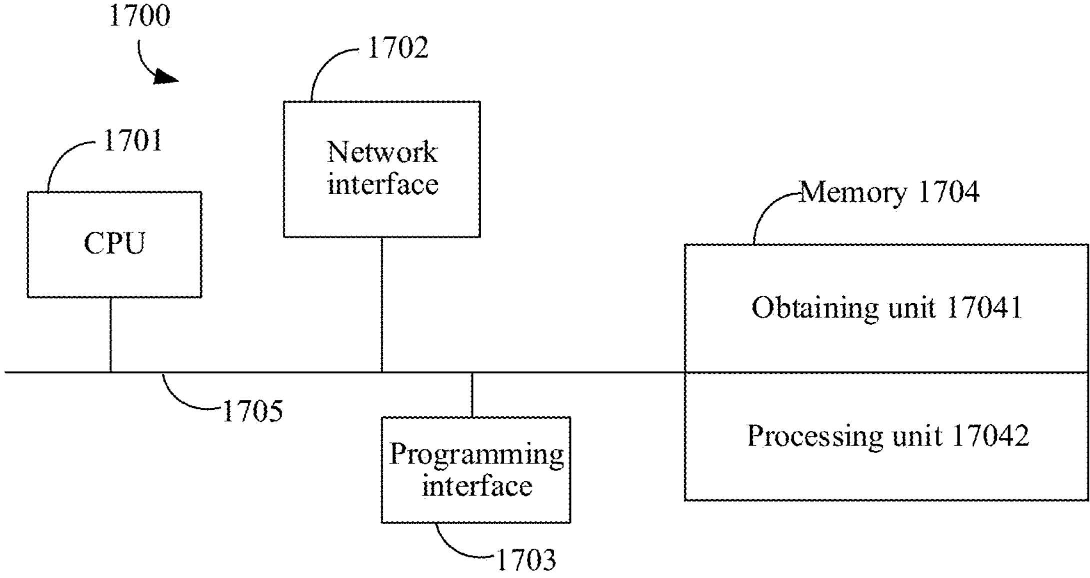
FIG. 17 is a schematic diagram of a structure of a network device 1700 according to an embodiment of this application.

To implement the foregoing embodiments, this application further provides a network device. Refer to FIG. 17. FIG. 17 is a schematic diagram of a structure of a network device 1700 according to an embodiment of this application.

Although the network device 1700 shown in FIG. 17 shows some specific features, a person skilled in the art will be aware from embodiments of this application that, for brevity, FIG. 17 does not show various other features, to avoid confusion with more related aspects of the implementations disclosed in embodiments of this application. For this purpose, as an example, in some implementations, the network device 1700 includes one or more processing units (for example, a CPU) 1701, a network interface 1702, a programming interface 1703, a memory 1704, and one or more communication buses 1705 configured to interconnect various components. In some other implementations, the network device 1700 may alternatively omit or add some functional components or units based on the foregoing examples.

In some implementations, the network interface 1702 is configured to connect to one or more other network devices/servers in a network system. In some implementations, the communication bus 1705 includes a circuit for interconnecting and controlling communication between system components. The memory 1704 may include a non-volatile memory, for example, a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The memory 1704 may also include a volatile memory. The volatile memory may be a random access memory (RAM), to be used as an external cache.

In some implementations, the memory 1704 or a non-transitory computer-readable storage medium of the memory 1704 stores the following programs, modules, and data structures, or a subset thereof, for example, includes a transceiver unit (not shown in the figure), an obtaining unit 17041, and a processing unit 17042.

In a possible embodiment, the network device 1700 may have any function of the sending end or the receiving end in the method embodiment corresponding to FIG. 7 or FIG. 8.

It should be understood that, the network device 1700 corresponds to the sending end, the receiving end, or the controller in the foregoing method embodiments. Modules and the foregoing other operations and/or functions in the network device 1700 are respectively used to implement various steps and methods implemented by the sending end, the receiving end, or the controller in the foregoing method embodiments. For specific details, refer to the method embodiment corresponding to FIG. 7 or FIG. 8. For brevity, details are not described herein again.

It should be understood that, in this application, the network interface 1702 on the network device 1700 may complete a data receiving and sending operation, or the processor may invoke program code in the memory, and implement a function of the transceiver unit in cooperation with the network interface 1702 when required.

In various implementations, the network device 1700 is configured to perform the slot consistency verification method provided in embodiments of this application, for example, perform the slot consistency verification method corresponding to the embodiment shown in FIG. 7 or FIG. 8.

Figure 18:
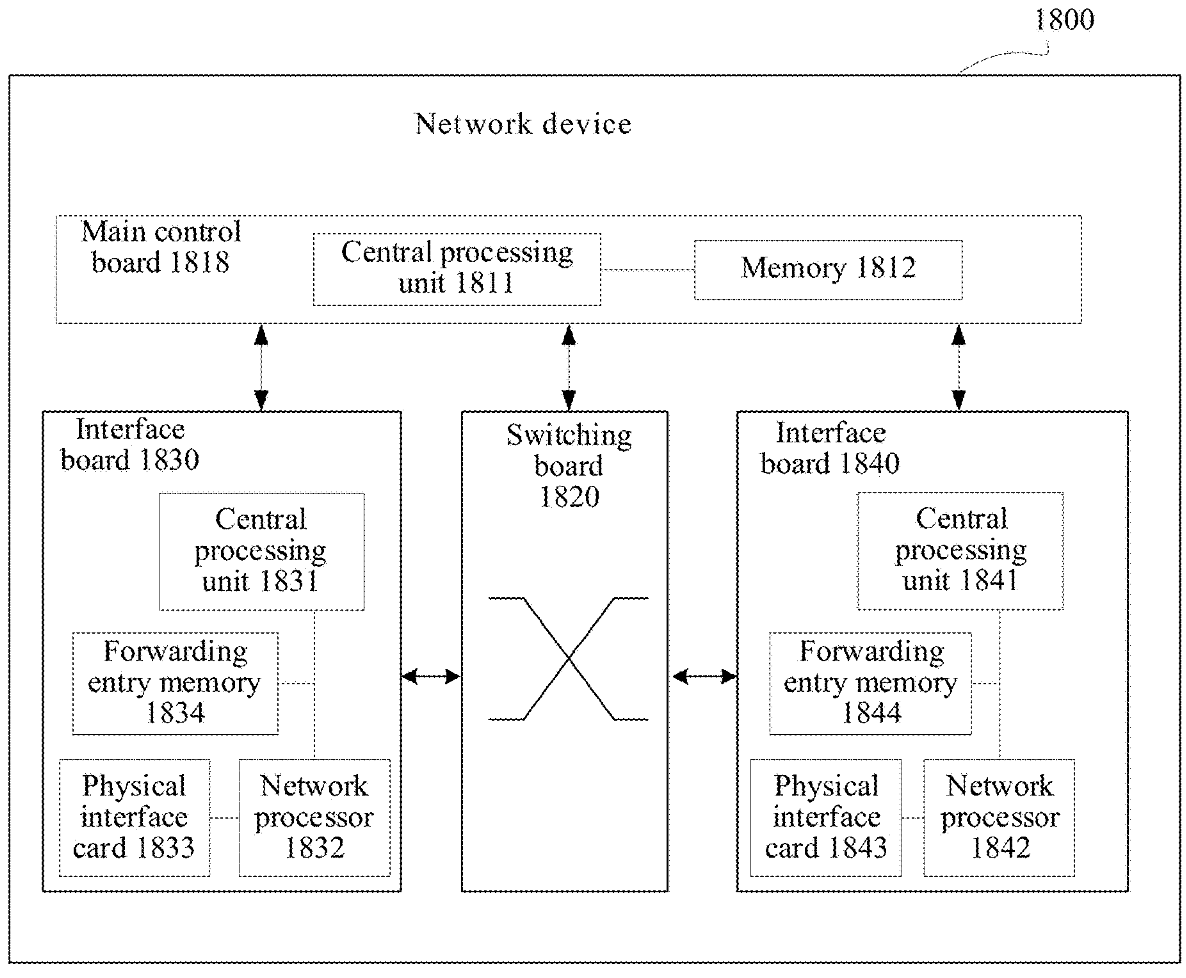
FIG. 18 is a schematic diagram of a structure of a network device 1800 according to an embodiment of this application.

A specific structure of the network device in FIG. 17 in this application may be shown in FIG. 18.

FIG. 18 is a schematic diagram of a structure of a network device 1800 according to an embodiment of this application. The network device 1800 includes a main control board 1818 and an interface board 1830.

The main control board 1818 is also referred to as a main processing unit (MPU) or a route processor. The main control board 1818 is configured to control and manage components in the network device 1800, including functions of route calculation, device management, device maintenance, and protocol processing. The main control board 1818 includes a central processing unit 1811 and a memory 1812.

The interface board 1830 is also referred to as a line processing unit (LPU), a line card, or a service board. The interface board 1830 is configured to provide various service interfaces, and forward a data packet. Service interfaces include but are not limited to Ethernet interfaces and packet over SONET/SDH (POS) interfaces. The interface board 1830 includes a central processing unit 1831, a network processor 1832, a forwarding entry memory 1834, and a physical interface card (PIC) 1833.

The central processing unit 1831 on the interface board 1830 is configured to control and manage the interface board 1830, and communicate with the central processing unit 1811 on the main control board 1818.

The network processor 1832 is configured to forward a packet. A form of the network processor 1832 may be a forwarding chip.

The physical interface card 1833 is configured to implement a physical layer interconnection function. Original traffic enters the interface board 1830 from the physical interface card 1833, and a processed packet is sent out from the physical interface card 1833. The physical interface card 1833 includes at least one physical interface. The physical interface is also referred to as a physical interface, and the physical interface may be a flexible Ethernet (FlexE) physical interface. The physical interface card 1833, also referred to as a subcard, may be mounted on the interface board 1830, and is responsible for converting an optical/electrical signal into a packet, performing validity check on the packet, and forwarding the packet to the network processor 1832 for processing. In some embodiments, the central processing unit 1831 on the interface board 1830 may also perform a function of the network processor 1832, for example, implement software forwarding based on a general-purpose CPU, so that the interface board 1830 does not need the network processor 1832.

Optionally, the network device 1800 includes a plurality of interface boards. For example, the network device 1800 further includes an interface board 1840, and the interface board 1840 includes a central processing unit 1841, a network processor 1842, a forwarding entry memory 1844, and a physical interface card 1843.

Optionally, the network device 1800 further includes a switching board 1820. The switching board 1820 may also be referred to as a switch fabric unit (SFU). When the network device has a plurality of interface boards 1830, the switching board 1820 is configured to complete data exchange between the interface boards. For example, the interface board 1830 and the interface board 1840 may communicate with each other via the switching board 1820.

The main control board 1818 is coupled to the interface board. For example, the main control board 1818, the interface board 1830, the interface board 1840, and the switching board 1820 are connected through a system bus and/or a system backplane to implement interworking. In a possible implementation, an inter-process communication (IPC) channel is established between the main control board 1818 and the interface board 1830, and the main control board 1818 communicates with the interface board 1830 through the IPC channel.

Logically, the network device 1800 includes a control plane and a forwarding plane. The control plane includes the main control board 1818 and the central processing unit 1831. The forwarding plane includes components that perform forwarding, such as the forwarding entry memory 1834, the physical interface card 1833, and the network processor 1832. The control plane performs functions such as advertising routing, generating a forwarding table, processing signaling and a protocol packet, and configuring and maintaining a device status. The control plane delivers the generated forwarding table to the forwarding plane. At the forwarding plane, by performing table lookup based on the forwarding table delivered by the control plane, the network processor 1832 forwards a packet received by the physical interface card 1833. The forwarding table delivered by the control plane may be stored in the forwarding entry memory

1834. In some embodiments, the control plane and the forwarding plane may be entirely separated, and are not on a same device.

It should be understood that, the transceiver unit in the network device 1700 may be equivalent to the physical interface card 1833 or the physical interface card 1843 in the network device 1800. The obtaining unit 17041 and the processing unit 17042 in the network device 1700 may be equivalent to the central processing unit 1811 or the central processing unit 1831 in the network device 1800, or may be equivalent to program code or instructions stored in the memory 1812.

It should be understood that, an operation on the interface board 1840 is consistent with an operation on the interface board 1830 in this embodiment of this application. For brevity, details are not described again. It should be understood that, the network device 1800 in this embodiment may correspond to the sending end or the receiving end in the foregoing method embodiments. The main control board 1818, the interface board 1830, and/or the interface board 1840 in the network device 1800 may implement functions and/or various steps implemented by the sending end or the receiving end in the foregoing method embodiments. For brevity, details are not described herein again.

It should be noted that, there may be one main control board or a plurality of main control boards hen there are the plurality of main control boards, the main control boards may include an active main control board and a standby main control board. There may be one or more interface boards, and a network device having a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the network device may not need the switching board, and the interface board provides a function of processing service data of an entire system. In a distributed forwarding architecture, the network device may have at least one switching board, and data exchange between a plurality of interface boards is performed by using the switching board, to provide large-capacity data exchange and processing capability. Optionally, a form of the network device may alternatively be in a form in which there is only one card. To be specific, there is no switching board, and functions of the interface board and the main control board are integrated on the card. In this case, the central processing unit on the interface board and the central processing unit on the main control board may be combined into one central processing unit on the card, to perform functions obtained after the two central processing units are combined. A specific architecture that is to be used depends on a specific networking deployment scenario. This is not limited herein.

In some possible embodiments, the sending end or the receiving end may be implemented as a virtualized device. The virtualization device may be a virtual machine (VM), a virtual router, or a virtual switch that runs a program used to send a packet. The virtualization device is deployed on a hardware device (for example, a physical server). For example, a first network device may be implemented based on a general-purpose physical server in combination with a network functions virtualization (NFV) technology.

It should be understood that, the network devices in the foregoing product forms have any function of the sending end or the receiving end in the foregoing method embodiments. Details are not described herein again.

An embodiment of this application further provides a computer-readable storage medium, including instructions. When the instructions are run on a computer, the computer is enabled to control a network apparatus to perform any one of the implementations shown in the foregoing method embodiments.

An embodiment of this application further provides a computer program product.

The computer program product includes computer program code. When the computer program code is run on a computer, the computer is enabled to perform any one of the implementations shown in the foregoing method embodiments.

Further, an embodiment of this application further provides a computer program product. When the computer program product is run on a network device, the network device is enabled to perform the method performed by the sending end, the receiving end, or the controller in the method embodiment corresponding to FIG. 7 or FIG. 8.

An embodiment of this application further provides a chip system, including a processor and an interface circuit. The interface circuit is configured to receive instructions and transmit the instructions to the processor. The processor is configured to implement the method in any one of the foregoing method embodiments.

Optionally, the chip system further includes a memory, and there may be one or more processors in the chip system. The processor may be implemented by using hardware, or may be implemented by using software. When the processor is implemented by using the hardware, the processor may be a logic circuit, an integrated circuit, or the like. When the processor is implemented by using software, the processor may be a general-purpose processor, and implements the method in any one of the foregoing method embodiments by reading software code stored in the memory.

Optionally, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. Atype of the memory and a manner of disposing the memory and the processor are not specifically limited in this application.

Figure 19:
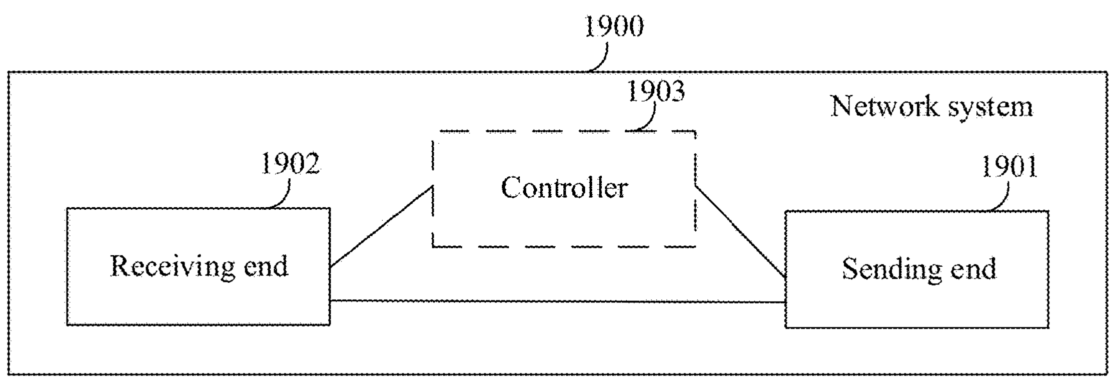
FIG. 19 is a schematic diagram of a network system 1900 according to an embodiment of this application.

Refer to FIG. 19. FIG. 19 is a schematic diagram of a network system 1900 according to an embodiment of this application. The network system 1900 includes a sending end 1901 and a receiving end 1902. The sending end 1901 and the receiving end 1902 may be, for example, physical devices such as a router, a switch, or a gateway, or may be virtual devices that support route advertisement and packet forwarding. Specific types of the sending end 1901 and the receiving end 1902 are not limited in this embodiment.

Optionally, the network system 1900 further includes a controller 1903. The controller 1903 may be a server that manages the sending end 1901 and the receiving end 1902. Optionally, the sending end 1901 may be the network device 1600, the network device 1700, or the network device 1800. Optionally, the receiving end 1902 may be the network device 1600, the network device 1700, or the network device 1800. Optionally, the controller 1903 may be the network device 1600, the network device 1700, or the network device 1800.

Figure 20:
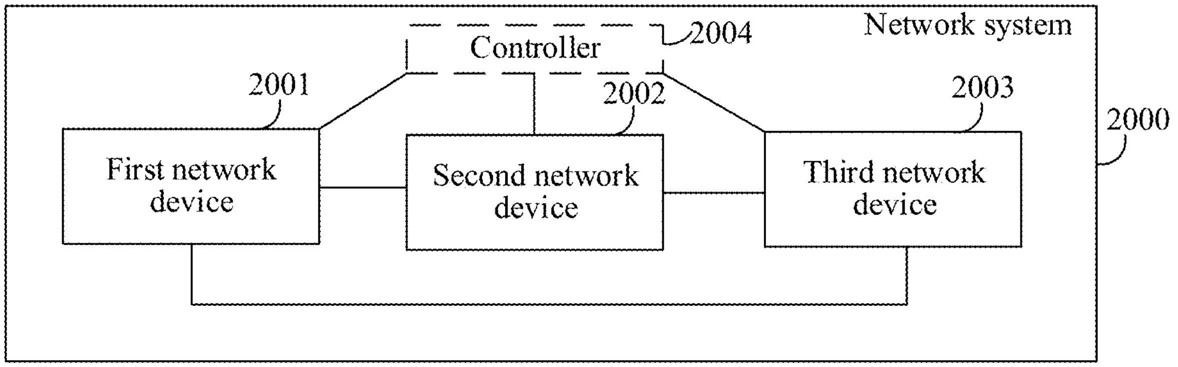
FIG. 20 is a schematic diagram of a network system 2000 according to an embodiment of this application.

Refer to FIG. 20. FIG. 20 is a schematic diagram of a network system 2000 according to an embodiment of this application. The network system 2000 includes a first network device 2001, a second network device 2002, and a third network device 2003. The first network device 2001, the second network device 2002, and the third network device 2003 may be, for example, physical devices such as a router, a switch, or a gateway, or may be virtual devices that support route advertisement and packet forwarding. Specific types of the first network device 2001, the second network device 2002, and the third network device 2003 are not limited in this embodiment.

For example, when the network system 2000 is applied to a scenario shown in FIG. 5 or FIG. 6, the first network device 2001 may be a PE1 node, the one or more second network devices 2002 may be a Pn node to a P1 node, and the third network device 2003 may be a PE0 node.

Optionally, the network system 2000 shown in FIG. 20 further includes a controller 2004. The controller 2004 is not shown in the scenario shown in FIG. 5 or FIG. 6.

In a possible implementation, the first network device 2001 receives first information from the second network device 2002, where the first information indicates that a receiving slot used by the second network device 2002 to receive a fine granularity service is consistent with a sending slot used by the first network device 2001 to send the fine granularity service; and the first network device 2001 sends a data block to the second network device 2002, where the data block includes a first basic frame overhead and a basic frame payload, the basic frame payload is for bearing the fine granularity service, and the fine granularity service is borne in the sending slot.

In a possible implementation, the first network device 2001 sends a second basic frame overhead to the second network device 2002, where the second basic frame overhead carries first indication information, and the first indication information indicates that the sending slot has taken effect.

In a possible implementation, the second basic frame overhead includes a C field, and the C field is for bearing the first indication information.

In a possible implementation, the first network device 2001 sends a third basic frame overhead to the second network device 2002, where the third basic frame overhead indicates the second network device 2002 to check the sending slot, the third basic frame overhead includes second information, and the second information is for identifying the sending slot.

In a possible implementation, the second information is a cyclic redundancy check CRC value generated by the first network device 2001 based on the sending slot.

In a possible implementation, the sending slot occupies N slots; and the first network device 2001 determines a first bit string based on the N slots, where N bits in the first bit string are in a one-to-one correspondence with the N slots, and N is an integer greater than or equal to 1; and the first network device 2001 encodes the first bit string by using a CRC algorithm, to generate the CRC value.

In a possible implementation, the sending slot occupies N slots; and the first network device 2001 sends N third basic frame overheads to the second network device 2002, where the N third basic frame overheads are in a one-to-one correspondence with N pieces of indication information, the N pieces of indication information are in a one-to-one correspondence with the N slots, each piece of indication information is for identifying each slot, and N is an integer greater than or equal to 1.

In a possible implementation, the third basic frame overhead includes a sub-slot identifier sub-slot ID field, and the sub-slot ID field is for bearing the second information.

In a possible implementation, the third basic frame overhead carries check indication information, and the check indication information indicates that the third basic frame overhead is for checking a slot resource of the fine granularity service.

In a possible implementation, the third basic frame overhead includes: a flag field or a reserved RES field, and the flag field or the reserved RES field is for bearing the check indication information.

In a possible implementation, the first information is borne in a reserved RES field of a basic frame overhead.

In a possible implementation, the first network device 2001 receives third information from the second network device 2002, where the third information indicates that the receiving slot used by the second network device 2002 to receive the fine granularity service is inconsistent with the sending slot used by the first network device 2001 to send the fine granularity service; and the first network device 2001 sends fourth information to the second network device 2002, where the fourth information indicates the second network device 2002 to reconfigure the slot resource of the fine granularity service, so that the receiving slot is consistent with the sending slot.

In a possible implementation, the second network device 2002 sends first information to the first network device 2001, where the first information indicates that a receiving slot used by the second network device 2002 to receive a fine granularity service is consistent with a sending slot used by the first network device 2001 to send the fine granularity service; and the second network device 2002 receives a data block from the first network device 2001, where the data block includes a first basic frame overhead and a basic frame payload, the basic frame payload is for bearing the fine granularity service, and the fine granularity service is borne in the sending slot.

In a possible implementation, the second network device 2002 receives a second basic frame overhead from the first network device 2001, where the second basic frame overhead carries first indication information, and the first indication information indicates that the sending slot has taken effect.

In a possible implementation, the second basic frame overhead includes a C field, and the C field is for bearing the first indication information.

In a possible implementation, the second network device 2002 receives a third basic frame overhead from the first network device 2001, where the third basic frame overhead indicates the second network device 2002 to check the sending slot, the third basic frame overhead includes second information, and the second information is for identifying the sending slot; and a processor is configured to check, based on the third overhead, whether the sending slot is consistent with the receiving slot.

In a possible implementation, the second information is a cyclic redundancy check CRC value generated by the first network device 2001 based on the sending slot.

In a possible implementation, the sending slot occupies N slots; and the second network device 2002 receives N third basic frame overheads from the first network device 2001, where the N third basic frame overheads are in a one-to-one correspondence with N pieces of indication information, the N pieces of indication information are in a one-to-one correspondence with the N slots, each piece of indication information is for identifying each slot, and N is an integer greater than or equal to 1.

In a possible implementation, the third basic frame overhead includes a sub-slot identifier sub-slot ID field, and the sub-slot ID field is for bearing the second information.

In a possible implementation, the third basic frame overhead carries check indication information, and the check indication information indicates that the third basic frame overhead is for checking a slot resource of the fine granularity service.

In a possible implementation, the third basic frame overhead includes: a flag field or a reserved RES field, and the flag field or the reserved RES field is for bearing the check indication information.

In a possible implementation, the first information is borne in a reserved RES field of a basic frame overhead.

In a possible implementation, the second network device 2002 sends third information to the first network device 2001, where the third information indicates that the receiving slot used by the second network device 2002 to receive the fine granularity service is inconsistent with the sending slot used by the first network device 2001 to send the fine granularity service; and the second network device 2002 receives fourth information from the first network device 2001, where the fourth information indicates the second network device 2002 to reconfigure the slot resource of the fine granularity service, so that the receiving slot is consistent with the sending slot.

In still another possible implementation, the second network device 2002 receives first information from the third network device 2003, where the first information indicates that a receiving slot used by the third network device 2003 to receive a fine granularity service is consistent with a sending slot used by the second network device 2002 to send the fine granularity service; and the second network device 2002 sends a data block to the third network device 2003, where the data block includes a first basic frame overhead and a basic frame payload, the basic frame payload is for bearing the fine granularity service, and the fine granularity service is borne in the sending slot.

In a possible implementation, the second network device 2002 sends a second basic frame overhead to the third network device 2003, where the second basic frame overhead carries first indication information, and the first indication information indicates that the sending slot has taken effect.

In a possible implementation, the second basic frame overhead includes a C field, and the C field is for bearing the first indication information.

In a possible implementation, the second network device 2002 sends a third basic frame overhead to the third network device 2003, where the third basic frame overhead indicates the third network device 2003 to check the sending slot, the third basic frame overhead includes second information, and the second information is for identifying the sending slot.

In a possible implementation, the second information is a cyclic redundancy check CRC value generated by the second network device 2002 based on the sending slot.

In a possible implementation, the sending slot occupies N slots; and the second network device 2002 determines a first bit string based on the N slots, where N bits in the first bit string are in a one-to-one correspondence with the N slots, and N is an integer greater than or equal to 1; and the second network device 2002 encodes the first bit string by using a CRC algorithm, to generate the CRC value.

In a possible implementation, the sending slot occupies N slots; and the second network device 2002 sends N third basic frame overheads to the third network device 2003, where the N third basic frame overheads are in a one-to-one correspondence with N pieces of indication information, the N pieces of indication information are in a one-to-one correspondence with the N slots, each piece of indication information is for identifying each slot, and N is an integer greater than or equal to 1.

In a possible implementation, the third basic frame overhead includes a sub-slot identifier sub-slot ID field, and the sub-slot ID field is for bearing the second information.

In a possible implementation, the third basic frame overhead carries check indication information, and the check indication information indicates that the third basic frame overhead is for checking a slot resource of the fine granularity service.

In a possible implementation, the third basic frame overhead includes: a flag field or a reserved RES field, and the flag field or the reserved RES field is for bearing the check indication information.

In a possible implementation, the first information is borne in a reserved RES field of a basic frame overhead.

In a possible implementation, the second network device 2002 receives third information from the third network device 2003, where the third information indicates that the receiving slot used by the third network device 2003 to receive the fine granularity service is inconsistent with the sending slot used by the second network device 2002 to send the fine granularity service; and the second network device 2002 sends fourth information to the third network device 2003, where the fourth information indicates the third network device 2003 to reconfigure the slot resource of the fine granularity service, so that the receiving slot is consistent with the sending slot.

In still another possible implementation, the third network device 2003 sends first information to the second network device 2002, where the first information indicates that a receiving slot used by the third network device 2003 to receive a fine granularity service is consistent with a sending slot used by the second network device 2002 to send the fine granularity service; and the third network device 2003 receives a data block from the second network device 2002, where the data block includes a first basic frame overhead and a basic frame payload, the basic frame payload is for bearing the fine granularity service, and the fine granularity service is borne in the sending slot.

In a possible implementation, the third network device 2003 receives a second basic frame overhead from the second network device 2002, where the second basic frame overhead carries first indication information, and the first indication information indicates that the sending slot has taken effect.

In a possible implementation, the second basic frame overhead includes a C field, and the C field is for bearing the first indication information.

In a possible implementation, the third network device 2003 receives a third basic frame overhead from the second network device 2002, where the third basic frame overhead indicates the third network device 2003 to check the sending slot, the third basic frame overhead includes second information, and the second information is for identifying the sending slot; and a processor is configured to check, based on the third overhead, whether the sending slot is consistent with the receiving slot.

In a possible implementation, the second information is a cyclic redundancy check CRC value generated by the second network device 2002 based on the sending slot.

In a possible implementation, the sending slot occupies N slots; and the third network device 2003 receives N third basic frame overheads from the second network device 2002, where the N third basic frame overheads are in a one-to-one correspondence with N pieces of indication information, the N pieces of indication information are in a one-to-one correspondence with the N slots, each piece of indication information is for identifying each slot, and N is an integer greater than or equal to 1.

In a possible implementation, the third basic frame overhead includes a sub-slot identifier sub-slot ID field, and the sub-slot ID field is for bearing the second information.

In a possible implementation, the third basic frame overhead carries check indication information, and the check indication information indicates that the third basic frame overhead is for checking a slot resource of the fine granularity service.

In a possible implementation, the third basic frame overhead includes: a flag field or a reserved RES field, and the flag field or the reserved RES field is for bearing the check indication information.

In a possible implementation, the first information is borne in a reserved RES field of a basic frame overhead.

In a possible implementation, the third network device 2003 sends third information to the second network device 2002, where the third information indicates that the receiving slot used by the third network device 2003 to receive the fine granularity service is inconsistent with the sending slot used by the second network device 2002 to send the fine granularity service; and the third network device 2003 receives fourth information from the second network device 2002, where the fourth information indicates the third network device 2003 to reconfigure the slot resource of the fine granularity service, so that the receiving slot is consistent with the sending slot.

The network devices in the foregoing product forms have any function of the sending end or the receiving end in the foregoing method embodiments. Details are not described herein again.

The foregoing describes embodiments of this application in detail. Steps in the method in embodiments of this application may be sequentially scheduled, combined, or deleted based on an actual requirement. Modules in the apparatus in embodiments of this application may be divided, combined, or deleted based on an actual requirement.

It should be understood that "one embodiment" or "an embodiment" mentioned in the whole specification means that particular features, structures, or characteristics related to the embodiment are included in at least one embodiment of this application. Therefore, "in one embodiment" or "in an embodiment" that appears throughput the whole specification does not necessarily mean a same embodiment. In addition, these specific features, structures, or properties may be merged in one or more embodiments in any proper manner. It should be understood that, sequence numbers of the foregoing processes do not mean execution sequences in embodiments of this application. The execution sequences of the processes should be determined based on functions and internal logic of the processes, and should not constitute any limitation on implementation processes of embodiments of this application.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in embodiments of this application, "B corresponding to A" indicates that B is associated with A, and B may be determined according to A. However, it should further be understood that determining A according to B does not mean that B is determined according to A only; that is, B may also be determined according to A and/or other information.

It may be clearly understood by a person skilled in the art that, for convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software function unit.

What is claimed is:

1. A slot consistency verification method applied to a network device at a sending end, comprising:

receiving, first information from a receiving end, wherein the first information indicates that a receiving slot used by the receiving end to receive a fine granularity service is consistent with a sending slot used by the sending end to send the fine granularity service; and sending, a data block to the receiving end, wherein the data block comprises a first basic frame overhead and a basic frame payload, the basic frame payload is for bearing the fine granularity service, and the fine granularity service is borne in the sending slot.

2. The method according to claim 1, wherein before receiving the first information, the method further comprises:

sending, a second basic frame overhead to the receiving end, wherein the second basic frame overhead carries first indication information, and the first indication information indicates that the sending slot has taken effect.

3. The method according to claim 2, wherein the second basic frame overhead comprises a C field, and the C field is for bearing the first indication information.

4. The method according to claim 1, wherein before receiving the first information, the method further comprises:

sending, a third basic frame overhead to the receiving end, wherein the third basic frame overhead indicates the receiving end to check the sending slot, the third basic frame overhead comprises second information, and the second information is for identifying the sending slot.

5. The method according to claim 4, wherein the second information is a cyclic redundancy check (CRC) value generated by the sending end based on the sending slot.

6. The method according to claim 5, wherein the sending slot occupies N slots; and the method further comprises:

determining, a first bit string based on the N slots, wherein N bits in the first bit string are in a one-to-one correspondence with the N slots, and N is an integer greater than or equal to 1; and encoding, the first bit string by using a CRC algorithm, to generate the CRC value.

7. The method according to claim 4, wherein the sending slot occupies N slots; and the method further comprises:

sending, N third basic frame overheads to the receiving end, wherein the N third basic frame overheads are in a one-to-one correspondence with N pieces of indication information, the N pieces of indication information are in a one-to-one correspondence with the N slots, each piece of indication information is for identifying each slot, and N is an integer greater than or equal to 1.

8. The method according to claim 4, wherein the third basic frame overhead comprises a sub-slot identifier (sub-slot ID) field, and the sub-slot ID field is for bearing the second information.

9. The method according to claim 4, wherein the third basic frame overhead carries check indication information, and the check indication information indicates that the third basic frame overhead is for checking a slot resource of the fine granularity service.

10. The method according to claim 9, wherein the third basic frame overhead comprises: a flag field or a reserved (RES) field, and the flag field or the reserved (RES) field is for bearing the check indication information.

11. The method according to claim 1, wherein the first information is borne in a reserved (RES) field of a basic frame overhead.

12. The method according to claim 1, further comprising:

receiving, third information from the receiving end, wherein the third information indicates that the receiving slot used by the receiving end to receive the fine granularity service is inconsistent with the sending slot used by the sending end to send the fine granularity service; and sending, fourth information to the receiving end, wherein the fourth information indicates the receiving end to reconfigure a slot resource of the fine granularity service, so that the receiving slot is consistent with the sending slot.

13. A slot consistency verification method applied to a network device at a receiving end, comprising:

sending, first information to a sending end, wherein the first information indicates that a receiving slot used by the receiving end to receive a fine granularity service is consistent with a sending slot used by the sending end to send the fine granularity service; and receiving, by the receiving end, a data block from the sending end, wherein the data block comprises a first basic frame overhead and a basic frame payload, the basic frame payload is for bearing the fine granularity service, and the fine granularity service is borne in the sending slot.

14. The method according to claim 13, wherein before sending the first information to the sending end, the method further comprises:

receiving, a second basic frame overhead from the sending end, wherein the second basic frame overhead carries first indication information, and the first indication information indicates that the sending slot has taken effect.

15. The method according to claim 14, wherein the second basic frame overhead comprises a C field, and the C field is for bearing the first indication information.

16. The method according to claim 13, wherein before sending the first information to the sending end, the method further comprises:

receiving, a third basic frame overhead from the sending end, wherein the third basic frame overhead indicates the receiving end to check the sending slot, the third basic frame overhead comprises second information, and the second information is for identifying the sending slot; and checking, based on the third basic frame overhead, whether the sending slot is consistent with the receiving slot.

17. The method according to claim 16, wherein the second information is a cyclic redundancy check (CRC) value generated by the sending end based on the sending slot.

18. The method according to claim 16, wherein the sending slot occupies N slots; and the method further comprises:

receiving, N third basic frame overheads from the sending end, wherein the N third basic frame overheads are in a one-to-one correspondence with N pieces of indication information, the N pieces of indication information are in a one-to-one correspondence with the N slots, each piece of indication information is for identifying each slot, and N is an integer greater than or equal to 1.

19. The method according to claim 16, wherein the third basic frame overhead comprises a sub-slot identifier (sub-slot ID) field, and the sub-slot ID field is for bearing the second information.

20. The method according to claim 16, wherein the third basic frame overhead carries check indication information, and the check indication information indicates that the third basic frame overhead is for checking a slot resource of the fine granularity service.

* * * * *